US012042729B2

(12) United States Patent
Osman et al.

(10) Patent No.: US 12,042,729 B2
(45) Date of Patent: Jul. 23, 2024

(54) HEAD MOUNTED DISPLAYS (HMDS) WITH FRONT FACING CAMERAS FOR TRANSITIONING BETWEEN NON-TRANSPARENT MODES AND TRANSPARENT MODES

(71) Applicant: Sony Interactive Entertainment Inc., Tokyo (JP)

(72) Inventors: Steven Osman, Foster City, CA (US); Xiaodong Mao, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/322,533

(22) Filed: May 23, 2023

(65) Prior Publication Data

US 2023/0293994 A1 Sep. 21, 2023

Related U.S. Application Data

(63) Continuation of application No. 17/589,892, filed on Jan. 31, 2022, now Pat. No. 11,654,358, which is a
(Continued)

(51) Int. Cl.
*A63F 13/537* (2014.01)
*A63F 13/00* (2014.01)
(Continued)

(52) U.S. Cl.
CPC ............ *A63F 13/537* (2014.09); *A63F 13/00* (2013.01); *A63F 13/211* (2014.09);
(Continued)

(58) Field of Classification Search
CPC .... A63F 13/211; A63F 13/212; A63F 13/213; A63F 13/537; A63F 13/26;
(Continued)

(56) References Cited

U.S. PATENT DOCUMENTS

| 5,900,849 A | * | 5/1999 | Gallery | ................ | G02B 27/017 345/7 |
| 2012/0050143 A1 | * | 3/2012 | Border | ............... | G02B 27/0172 345/8 |

(Continued)

*Primary Examiner* — Steve Rowland
(74) *Attorney, Agent, or Firm* — PENILLA IP, APC

(57) ABSTRACT

Systems and methods for executing content to be rendered on a screen of a head mounted display (HMD) are provided. One method includes executing the content to render interactive scenes on the screen and tracking an orientation direction of the HMD when worn on a head of a user and the interactive scenes are being rendered on the screen. The method includes changing view directions into the interactive scenes based on changes in the orientation direction of the HMD, such that movements of the head of the user causes the changes in the view directions into the interactive scenes. The method further includes receiving images of a real world space using a camera of the HMD. The camera of the HMD is configured to capture a location of real world objects in the real world space relative to the user of the HMD. The method includes detecting that at least one real world object is becoming proximate to the user of the HMD and generating a warning or message to be presented to the HMD, the warning or message indicating that the user is likely to bump or contact the at least one real world object. The method further includes transitioning at least a portion of the screen to a transparent mode. The transparent mode provides at least a partial view into the real world space using the camera of the HMD.

14 Claims, 20 Drawing Sheets

Related U.S. Application Data continuation of application No. 16/919,731, filed on Jul. 2, 2020, now Pat. No. 11,235,243, which is a continuation of application No. 16/027,199, filed on Jul. 3, 2018, now Pat. No. 10,722,797, which is a continuation of application No. 15/087,801, filed on Mar. 31, 2016, now Pat. No. 10,010,792, which is a continuation of application No. 14/254,881, filed on Apr. 16, 2014, now Pat. No. 9,908,048.

(60) Provisional application No. 61/832,778, filed on Jun. 8, 2013.

(51) Int. Cl.
*A63F 13/211* (2014.01)
*A63F 13/212* (2014.01)
*A63F 13/213* (2014.01)
*A63F 13/26* (2014.01)
*A63F 13/5255* (2014.01)
*G06F 3/01* (2006.01)
*H04N 13/344* (2018.01)

(52) U.S. Cl.
CPC .......... *A63F 13/212* (2014.09); *A63F 13/213* (2014.09); *A63F 13/26* (2014.09); *A63F 13/5255* (2014.09); *G06F 3/011* (2013.01); *G06F 3/013* (2013.01); *H04N 13/344* (2018.05); *A63F 2300/6653* (2013.01)

(58) Field of Classification Search
CPC .................. A63F 13/5255; A63F 13/00; A63F 2300/5553; A63F 2300/6653; H04N 13/344; G06F 3/011; G06F 3/013
See application file for complete search history.

(56) References Cited

U.S. PATENT DOCUMENTS

| | | | | |
|---|---|---|---|---|
| 2012/0068913 | A1* | 3/2012 | Bar-Zeev | G02B 27/017 345/8 |
| 2013/0205314 | A1* | 8/2013 | Ramaswamy | H04H 60/33 725/14 |
| 2013/0222308 | A1* | 8/2013 | Ma | G06F 3/0412 345/697 |
| 2013/0328927 | A1* | 12/2013 | Mount | G06T 19/20 345/633 |
| 2014/0049558 | A1* | 2/2014 | Krauss | H04N 21/42208 345/633 |
| 2015/0046296 | A1* | 2/2015 | Hart | G06Q 30/0242 705/27.2 |

* cited by examiner

Communication architecture of a head mounted display

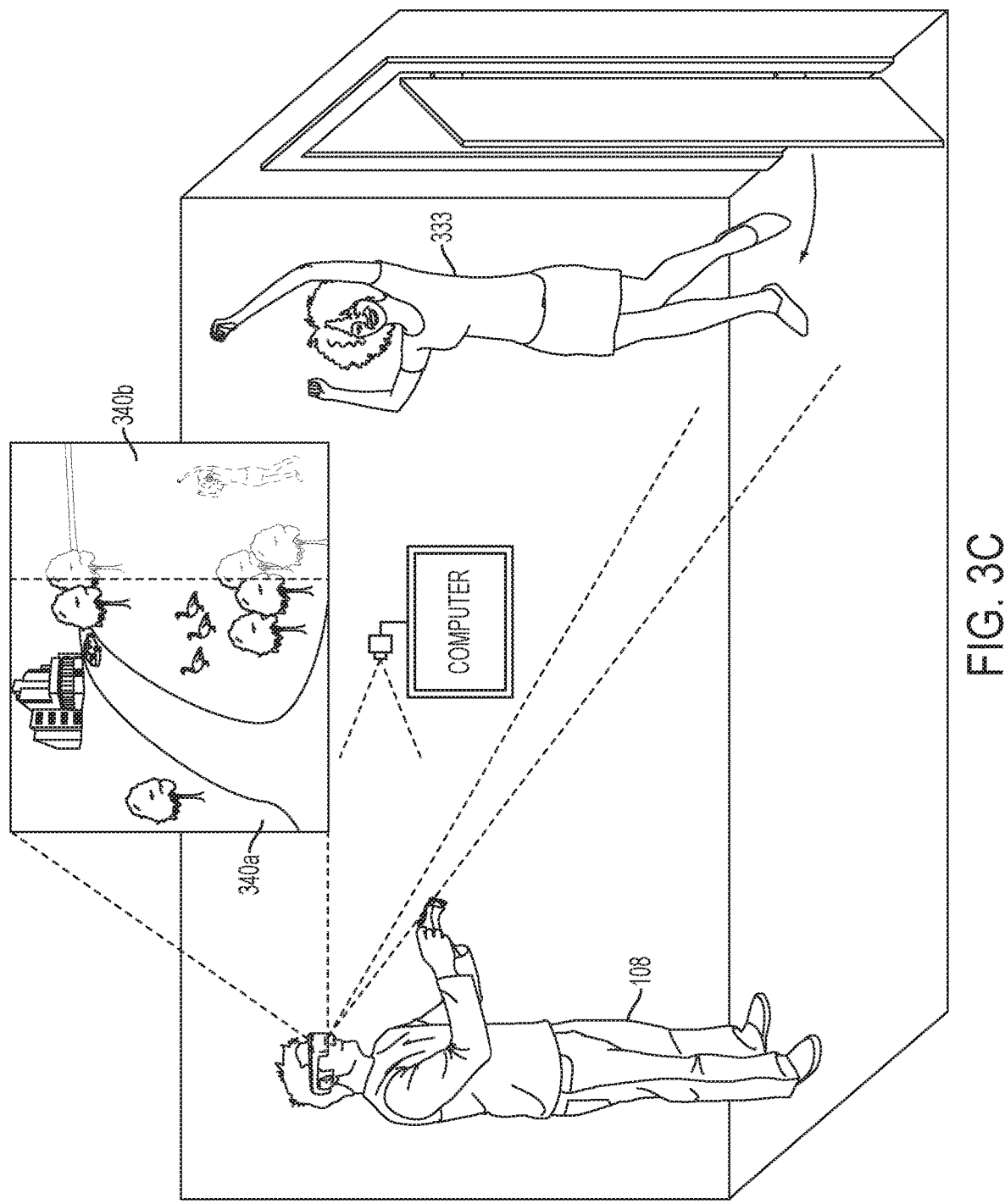

HEAD MOUNTED DISPLAYS (HMDS) WITH FRONT FACING CAMERAS FOR TRANSITIONING BETWEEN NON-TRANSPARENT MODES AND TRANSPARENT MODES

CLAIM OF PRIORITY

This is a continuation of U.S. patent application Ser. No. 17/589,892, filed on Jan. 31, 2022, and entitled, Head Mounted Displays (HMDs) with Front Facing Cameras for Transitioning Between Non-Transparent Modes and Transparent Modes," which is a continuation of U.S. patent application Ser. No. 16/919,731, filed on Jul. 2, 2020, and entitled, "Head Mounted Displays (HMDs) with Front Facing Cameras for Transitioning Between Non-Transparent Modes and Transparent Modes," (since issued as U.S. Pat. No. 11,235,243 on Jan. 12, 2022) which is a continuation of U.S. patent application Ser. No. 16/027,199, filed on Jul. 3, 2018, and entitled, "Head Mounted Displays (HMDs) with Front Facing Cameras for Transitioning Between Non-Transparent Modes and Transparent Modes," (since issued as U.S. Pat. No. 10,722,797 on Jul. 28, 2020) which is a continuation of U.S. patent application Ser. No. 15/087,801, filed on Mar. 31, 2016, and entitled "Head Mounted Displays (HMDs) with Front Facing Cameras for Transitioning Between Non-Transparent Modes to Transparent Modes," (since issued as U.S. Pat. No. 10,010,792 on Jul. 3, 2018), which is a continuation of U.S. patent application Ser. No. 14/254,881, filed on Apr. 16, 2014, and entitled "Systems and Methods for Transitioning between Transparent Mode and Non-Transparent Mode in a Head Mounted Display," (since issued as U.S. Pat. No. 9,908,048 on Mar. 6, 2018) which claims priority under 35 USC § 119 (e), to U.S. Provisional Patent Application No. 61/832,778, filed on Jun. 8, 2013, and entitled "SYSTEMS AND METHODS FOR TRANSITIONING BETWEEN TRANSPARENT MODE AND NON-TRANSPARENT MODE IN A HEAD MOUNTED DISPLAY," which are incorporated herein by reference in their entirety.

FIELD OF THE INVENTION

The present invention relates to methods and systems for providing warnings and notices to users of HMDs and modes for transitioning the screen between a transparent mode and a non-transparent mode.

BACKGROUND

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

A number of gaming platforms have been developed and sold in the form of game consoles. A typical game console is designed to connect to a monitor (usually a television) and enable user interaction through handheld controllers. The game console is designed with specialized processing hardware, including a central processing unit (CPU), a graphics synthesizer for processing intensive graphics operations, a vector unit for performing geometry transformations, and other glue hardware, software, and firmware. The game console is further designed with an optical disc tray for receiving game compact discs for local play through the game console. The game console is also designed for online gaming, where a user can interactively play against or with other users over the Internet. As game complexity continues to intrigue players, game and hardware manufacturers have continued to innovate to enable additional interactivity and computer programs.

A growing trend in the computer gaming industry is to develop games and game controllers that increase the interaction between user and the gaming system. The game controllers include features that enable richer interactive experience by allowing a gaming system to track the player's varied movements, and use these movements as inputs for a game executed on the gaming system.

It is in this context that embodiments of the invention arise.

SUMMARY

Embodiments of the present invention provide systems and methods for transitioning from one transparent mode to another as described herein.

Broadly speaking, various embodiments of the invention disclose systems and methods for executing a game presented on a screen of a head mounted display (HMD). A game is executed and interactive scenes from the game are rendered on a screen of the head mounted display. Images of the HMD worn by a user are received and are used to identify a first spatial position of the HMD relative to a capture location that is directed toward the user. Images of a controller held by the user are received and are used to identify a second spatial location of the controller relative to the capture location. The controller provides input to at least partially drive interaction with the game being executed. Images that identify a gaze direction of the user viewing the interactive scenes presented on the screen of the HMD, are received. Real-world images captured from a forward direction of the HMD are also received. A portion of the screen is transitioned to a transparent mode such that the transparent mode replaces the interactive scenes rendered in the portion of the screen with at least part of the real-world images. The transparent mode is discontinued after a period of time so that the user can continue to fully immerse in the game and fully experience the game play. The transition from non-transparent mode, where the user is fully immersed in the game, to a transparent mode enables a user to have a peek into the real-world without disrupting the user's game play. The transition also allows the user to gradually enter the real-world from a highly intense game.

In one embodiment, a method is provided for executing content to be rendered on a screen of a head mounted display (HMD). The method includes executing the content to render interactive scenes on the screen. The screen is being operated in a non-transparent mode. An orientation of the HMD worn on a head of a user, is tracked while the interactive scenes are being rendered on the screen. Any changes in the orientation of the HMD causes a change in a view direction into the interactive scenes that is being rendered on the screen. Images of a real world space is received from a pair of cameras of the HMD. The images are being captured while the interactive scenes are being rendered on the screen of the HMD. The pair of cameras of the HMD is configured to capture three dimensional position of real world objects in relation to a location of the HMD in the real world space. The images of the real world space captured by the pair of cameras of HMD are analyzed to determine when the HMD is getting proximate to at least one real world object. In response to detecting the proximity of the HMD to the real world object, a portion of the screen of the HMD is transitioned to a transparent mode so as to provide at least a partial view out to the real world space in a direction of the at least one real world object.

In another embodiment, a method for executing an interactive game, is disclosed. The method includes executing the interactive game. The interactive game is a multi-player game. In response to the execution of the game, interactive scenes of the interactive game are rendered on a screen of a first HMD worn by a first user and a screen of a second HMD worn by a second user. The screens of the first HMD and the second HMD are being operated in a non-transparent mode. An action initiated by the first user is detected while the interactive scenes are being rendered on the screens of the first HMD and the second HMD. The action of the first user is directed to a region in a real-world environment in which the first and the second users are interacting with the interactive game. The action is analyzed to identify an object in the region of the real-world environment toward which the action is directed. The action is analyzed using images of the real-world environment captured by one or more image sensing devices available within the real-world environment. A portion of the screen of the second HMD worn by the second user is transitioned from the non-transparent mode to a transparent mode, so as to provide a view of the object in the region, to the second user.

Other aspects of the invention will become apparent from the following detailed description, taken in conjunction with the accompanying drawings, illustrating by way of example the principles of embodiments of the invention.

BRIEF DESCRIPTION OF THE DRAWINGS

Various embodiments of the present invention may best be understood by reference to the following description taken in conjunction with the accompanying drawings in which:

FIGS. 3A-3G illustrate implementation of transitioning between a non-transparent mode to a semi-transparent or fully transparent mode, in some embodiments of the invention.

DETAILED DESCRIPTION

Figure 1A:
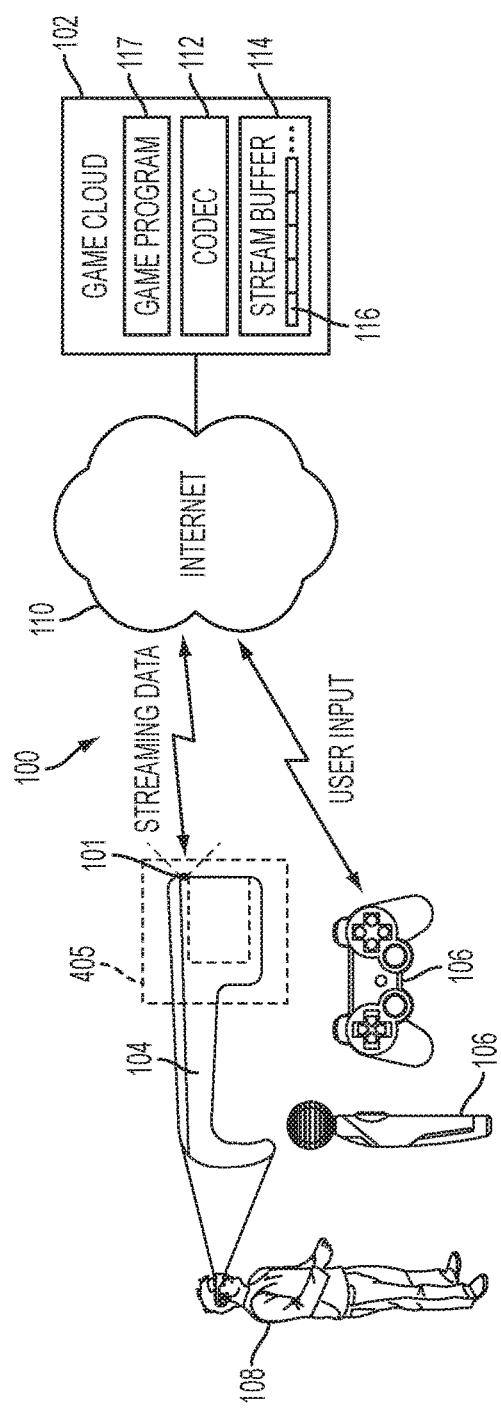
FIGS. 1A-1D illustrate different system architecture configuration of a game environment, in accordance with some embodiments of the present invention.

Systems and methods for transitioning from a non-transparent mode to a semi-transparent or fully transparent mode within a head mounted display (HMD) are described. A game executing on a game console or game cloud causes interactive scenes of the game to be rendered on a screen of the HMD. During execution of the game, an occurrence of a trigger event is detected. In response to the detection of the trigger event, either a portion of the screen or the full screen of the HMD is transitioned from a non-transparent mode to semi-transparent or fully transparent mode. The transitioning allows presenting at least part of the real-world images captured from the vicinity of the HMD alongside the interactive scenes rendered in the portion of the HMD screen or to allow a user to view the real-world images from the vicinity of the HMD through the screen.

In some embodiments, the transitioning to a semi-transparent mode includes making the interactive scenes fade into the background while rendering the real-world images in the foreground. In some embodiments, the transition may be done in gradual increments. In some embodiments, the transition in gradual increments may be linear or non-linear depending on the game intensity. In some embodiments, the transitioning to a fully transparent mode includes replacing the interactive scenes rendering in the portion of the HMD screen with the real-world images captured by a forward facing camera of the HMD. In other embodiments, the transition from non-transparent mode to fully-transparent mode is effectuated by adjusting optic characteristics of the screen to make the screen fully transparent. In some embodiments, the event may be triggered when a change in gaze direction of the user wearing the HMD is detected. In some other embodiments, the event may be triggered when a movement is detected in the immediate real-world environment of the user, such as a person entering a room where the user is playing the game using the HMD, or sound is detected by the HMD within the immediate real-world environment of the user, etc. In some embodiments, the trigger event may be in response to a voice or motion command from the user or a command issued from a controller or the HMD.

It should be noted that various embodiments described in the present disclosure may be practiced without some or all of these specific details. In other instances, well known process operations have not been described in detail in order not to unnecessarily obscure various embodiments described in the present disclosure.

In one embodiment, the system includes a computer, a hand-held controller (HHC), and a head mounted display (HMD). In various embodiments, the computer may be a general purpose computer, a special purpose computer, a gaming console, a mobile phone, a tablet device, or other such device which executes one or more portions of an interactive program that is rendered on a display screen of the HMD. The interactive program may be a multi-user game program that is played by multiple users or a single user game program played by a user. In some embodiments, at least a portion of the game program is executing on the computer. In such embodiments, any remaining portions of the interactive program are executed on a game cloud system, e.g., one or more virtual machines (VMs). In some embodiments, all portions of the interactive program are executed on the game cloud system.

The HMD is a display device, worn directly on a head of a user or as part of a helmet. The HMD has a small display optic in front of one or each eye of the user. In some embodiments, the HMD is capable of receiving and rendering video output from the program executing on the computer and/or on the game cloud system. A user operates a hand held controller (HHC) and/or the HMD to generate one or more inputs that are provided to the interactive program. In various embodiments, the HHC and/or the HMD communicates wirelessly with the computer, as this provides for greater freedom of movement of the HHC and/or the HMD than a wired connection. The HHC may include any of various features for providing input to the interactive program, such as buttons, inertial sensors, trackable LED lights, touch screen, a joystick with input controls, directional pad, trigger, touchpad, touchscreen, and may have circuitry/logic to detect and interpret hand gestures, voice input or other types of input mechanisms. Furthermore, the HHC may be a motion controller that enables the user to interface with and provide input to the interactive program by moving the controller.

Along similar lines, the HMD may include a user input circuit that enables the user to interface with and provide input to the interactive program by moving the HMD. Various technologies may be employed to detect the position and movement of the motion controller and/or the HMD. For example, the motion controller and/or the user input circuit of the HMD may include various types of inertial sensor circuits, such as accelerometers, gyroscopes, and magnetometers. In some embodiments, the motion controller may include global position systems (GPS), compass, etc. In some embodiments, an accelerometer is a 6-axis low latency accelerometer. In some embodiments, the motion controller and/or the user input circuit can include one or more fixed reference objects (otherwise termed "marker elements"), e.g., light emitting diodes (LEDs), colored points, light reflectors, etc. The images of the fixed reference objects are captured by one or more digital cameras of the system. In some embodiments, a digital camera includes a video camera that further includes a single Charge Coupled Device (CCD), an LED indicator, and hardware-based real-time data compression and encoding apparatus so that compressed video data may be transmitted in an appropriate format, such as an intra-image based motion picture expert group (MPEG) standard format. The position and movement of the motion controller and/or the HMD can then be determined through analysis of the images captured by the one or more digital cameras.

FIG. 1A is an embodiment of an exemplary configuration of a system 100. In one embodiment, the system includes a game cloud 102, an HMD 104 and an HHC 106 communicating over the internet 110. In one embodiment, the HMD 104 includes a router (not shown) to communicate with the internet 110. In some embodiments, the game cloud 102 is referred to herein as a game cloud system. The HMD 104 is placed by a user 108 on his head, such that the display screen(s) align in front of his/her eye(s), in a similar manner in which the user 108 would put on a helmet. The HHC 106 is held by the user 106 in his/her hands.

In various embodiments, instead of the HHC 106, hands of the user 108 may be used to provide gestures, e.g., hand gestures, finger gestures, etc., that may be interpreted by interactive program and/or the logic within the HMD 104. In such embodiments, the user may wear an interactive glove with sensors to provide tactile feedback. The interactive glove acts as the HHC, when worn by a user, and provides input in the form of interactive gestures/actions to the interactive program and/or the HMD. The interactive glove may include marker elements, such as LEDs, light reflectors, etc., to allow detection of various movements. The interactive glove is one form of wearable device that is used to provide input to the HMD and/or the interactive program and that other forms of wearable clothing/device may also be engaged. A digital camera 101 of the HMD 104 captures images of the gestures and a processor within the HMD 104 analyzes the gestures to determine whether a game displayed within the HMD 104 is affected. In one embodiment, the camera 101 is an external digital camera located on a face plate 405 of the HMD 104 facing forward. In some embodiments, more than one external digital camera may be provided on the face plate of the HMD 104 to capture different angles of the real-world images. In some embodiments, the camera may be stereo camera, an IR camera, a single-lens camera, etc. As used herein, the processor may be a microprocessor, a programmable logic device, an application specific integrated circuit, or a combination thereof.

The system 100 includes a network 110, which may be a local area network (LAN), a wide area network (WAN), or a combination thereof. Examples of the network 110 include the Internet, an Intranet, or a combination thereof. In some embodiments, the network 110 uses a transmission control protocol (TCP)/Internet Protocol (IP) to communicate media data via the network 110 between the game cloud 102 and the HMD 104 or the HHC 106. The embodiments are not restricted to the TCP/IP protocol but can also engaged other forms of communication protocols for communicating media data via the network. In various embodiments, the network uses a combination of Ethernet and TCP/IP to protocol to communicate media data via the network 110 between the game cloud 102 and the HMD 104 or the HHC 106.

The game cloud 102 includes a coder/decoder (codec) 112 and a stream buffer 114. The stream buffer 114 stores a stream of media data 116, which is generated upon execution of a game program 117. The media data 116 includes virtual environment data, virtual game object data, a combination thereof, etc. The virtual environment data is used to generate a virtual environment of a game and the virtual game object data is used to generate one or more virtual game objects, e.g., virtual game characters, virtual game objects, virtual points, virtual prizes, game interface, etc. The game program 117 is an example of the interactive program executed by one or more servers of the game cloud 102. The codec 112 uses a compressor/decompressor to code/decode media data using lossy compression, lossless compression, etc.

The HMD 104 is used to access an operating system (OS) that is executed by the processor of the HMD 104. For example, selection and activation of a button in the HMD 104 enables the processor of the HMD 104 to execute the OS. Similarly, the HHC 106 may be used to access an OS that is executed by the processor of the HHC 106. A button on the HHC 106 may be used to have the processor of the HHC 106 to execute the OS.

In some embodiments, the OS allows the HMD 104 to directly access the network 110. For example, a user may select a network access application that is executed by the processor of the HMD 104 on top of the OS, using a network access icon, a network access symbol, etc. The network access application provides a list of networks from which to select a network for accessing the network 110. User authentication may be required to access the network 110, in accordance to network access protocol. Access to the network 110 is enabled is enabled for the user upon selection and successful user authentication (if needed). A built-in router (not shown) within the HMD 104 uses the network 110 to interact with the game cloud to exchange game data. In these embodiments, the communication between the network 110 and the HMD 104 follows a wireless communication protocol. Along similar lines, the HHC 106 gains access to the network 110 by selecting the network using network access application and the communication between the HHC 106 and the network follows a wireless communication protocol.

Once the network 110 is accessed, the OS allows the HMD 104 to access the game program 117 in a manner similar to the selection of the network. For example, when the user 108 selects a game access application executed by the processor of the HMD 104 on top of the OS through a game access icon, a game access symbol, etc., the game access application requests access to the game program 117 via the processor of the HMD 104 for displaying to the user 108. Upon obtaining access to the game program 117, a microcontroller of the HMD 104 displays the game on a display screen of the HMD 104. In some embodiments, the display screen of the HMD 104 is a high performance screen to reduce blur when the HMD 104 is moved rapidly. In one embodiment, the display screen is a Liquid Crystal Display (LCD) screen. The user 108 performs one or more head and/or eye motions, e.g., head tilting, winking, gazing, shifting gaze, staring, etc., and each head or eye motion triggers the user input circuit to generate an input, which may be used to play the game. In these embodiments, the game program 117 executes on the game cloud 102 and the communication between the game program 117 and the HMD 104 is through the built-in router and the network 110.

In some embodiments, the game access application requests user authentication information, such as a username and/or a password, from the user 108 to access the game program 117. Upon receiving successful authentication from the game cloud 102, the game access application allows access of the game program 117 to the user 108.

In various embodiments, instead of accessing the game application/program, the user 108 requests access to a web page upon accessing the network 110 and the web page allows the user 108 to access the game program 117. For example, the user 108 selects a web browser application via the user input circuit or via the HHC 106 to access a web page. Upon accessing the web page, the user 108 plays a game displayed on the web page or accesses the game using a link provided within. The game is rendered when the game program 117 is executed on the game cloud 102. In some embodiments, user authentication may be required before providing access to the web page to play the game that is displayed when the game program 117 is executed on the game cloud 102. The username and/or the password is authenticated in a manner similar to that described above when the user 108 accesses a game via the game access application.

When the game program 117 is accessed, the codec 112 encodes, e.g., compresses, etc., a digital data stream of the media data 116 for sending a stream of encoded media data to the HMD 104 via the network 110. In some embodiments, a digital data stream of the encoded media data is in the form of packets for sending via the network 110.

The HMD 104 receives the digital data stream of the encoded media data for the selected game program via the network 110 from the codec 112 and the digital data stream is processed, e.g., depacketized, decoded, etc., and the processed stream is used to display a game on the display screen of the HMD 104. When a game data is displayed on the display screen of the HMD 104. An external camera 101 of the HMD 104 captures one or more images of a real-world environment in the immediate vicinity of the user 108, in response to detection of a trigger event at the HMD. In some embodiments, the external camera 101 is a video camera. Examples of the real-world environment include a room from where the user 108 is accessing the game, a geographical region in which the user 108 is located, real-world objects around the user 108, etc. Examples of a geographical region include a park, a road, a street, a lake, a city, a landmark, etc. Examples of a real-world object include a bus stand, a coffee shop, a store, an office, a vehicle, a room, a desk, a table, a chair, a ball, etc. Real-world environment data, including one or more images of the real-world environment, in one embodiment, is processed and stored locally in the HMD and used for subsequent rendering on the screen of the HMD. User input, such as a trigger event, may be processed, packetized and encoded by the HMD 104, and sent to the codec 112 in the game cloud 102 through the built-in router and the network 110. In some embodiments, in addition to the user input, the real-world environment data may also be packetized and encoded by the HMD 104 and sent as a stream of encoded environment data via the built-in router of the HMD 104, the network 110 to the codec 112 in the game cloud 102.

Upon receiving the user input and/or the real-world environment data, the game program 117 generates additional media data that is packetized by one or more servers of the game cloud 102 to generate a stream of additional media data. The additional media data may include modifications to game play, including modifications to virtual game object, e.g., computer-generated object, etc., that is used for updating the virtual game environment rendered on the HMD. The stream of additional media data is stored in the stream buffer 114, encoded by the codec 112, and sent as a stream of encoded additional media data via the network 110 to the HMD 104. The HMD 104 receives the stream of encoded additional media data, depacketizes the stream, and decodes the encoded additional media data to provide the additional media data to the microcontroller of the HMD 104. The microcontroller of the HMD 104 changes a display of a game that is executed by the game program 117 rendered on the screen of the HMD based on the additional media data.

User inputs may be provided through the HMD 104 and/or the HHC 106. For example, the user 108 may provide input using input interface/mechanism provided in the HMD 104. Alternately, the user 108 may perform hand motions, e.g., press of a button, movement of a joystick, hand gesture, finger gesture, a combination thereof, etc., using the HHC and such user input provided at the HHC 106 generates input data that is converted into input signals by a communications circuit of the HHC 106 for sending to a communications circuit of the HMD 104. Of course, the HHC includes hand-held controllers, joysticks, motion controllers, wearable articles of clothing, wearable devices, etc. The input signals originating from the HHC 106 and the HMD 104 are converted from an analog form to a digital form by the communications circuit of the HMD 104, packetized, encoded by the HMD 104 and sent via the network 110 to the codec 112. Examples of a communications circuit of the HMD include a transceiver, a transmit/receive circuitry, a network interface controller, etc.

In some embodiments, the game program 117 maps input data that is generated by the HMD with input data that is generated at the HHC (for e.g., based on the hand motions) to determine whether to change a state of a game that is displayed on the HMD 104. For example, when an input from the HMD is received via the network 110 with an input generated at the HHC 106, such as a press of a button on the HHC 106, the game program 116 determines to change a state of a game. Otherwise, the game program 117 determines not to change a state of a game.

Input data of the inputs generated based on the hand motions and/or hand-held controller motions are communicated by a communications circuit of the HHC 106, e.g., a transceiver, a transmit/receive circuitry, etc., to a communications circuit, e.g., a transceiver, a transmit/receive circuitry, etc., of the HMD 104. Input data communicated to the HMD and/or input data generated by the HMD are packetized and encoded by the HMD 104 and sent as a stream of encoded input data via the network 110 to the codec 112. For example, the input data may be sent directly from the HMD 104 using the built-in router via the network 110 to the game cloud 102. In a number of embodiments, the user 108 performs the hand motions and provides user input from the HMD to change a location and/or orientation of the virtual object rendered at the HMD.

The codec 112 decodes, e.g., decompresses, etc., the stream of encoded input data received via the network 110 from the HMD 104 and the decoded input data is buffered in the stream buffer 114 for depacketizing and sending to the game program 117. One or more servers of the game cloud 102 depacketizes the stream of decoded input data and sends the input data to the game program 117. Upon receiving the input data, the game program 117 generates next media data that is packetized to generate a stream of next media data by one or more servers of the game cloud 102. The stream of next media data is stored in the stream buffer 114, encoded by the codec 112, and sent as a stream of encoded next media data via the network 110 to the HMD 104. The HMD 104 receives the stream of encoded next media data, depacketizes the stream, and decodes the encoded next media data to provide the next media data to the microcontroller of the HMD 104. The microcontroller of the HMD 104 changes a display of a game that is executed by the game program 117 based on the next media data. For example, the microcontroller changes a look, position, and/or orientation of the virtual game object that is either overlaid on the one or more images of the real-world environment or simply rendered on the screen of the HMD 104.

It should be noted that the input data generated at the HHC and/or the HMD changes a state of the game. In some embodiments, a display of a game is referred to herein as a portion of interactivity associated with the game program 117.

In various embodiments, instead of communicating the input data that is generated based on the hand motions from the HHC 106 to the HMD 104, the input data is communicated directly from the HHC 106 via the network 110 to the codec 112. The input data that is generated at the HHC 106 is communicated by the HHC 106 in a manner similar to the communication by the HMD 104. For example, the input data that is generated based on the hand motions from the HHC 106 is encoded and packetized by the HHC 106 and sent as a stream of encoded input data via the network 110 to the codec 112.

It should be noted that in the embodiment illustrated in FIG. 1A, the HMD and the HHC individually directly communicate with the network 110 without going through a game console or an external router. In an alternate embodiment, the HHC may communicate with the HMD to transmit the input data generated at the HHC and the HMD may directly communicate the data at the HHC and/or the HMD with the network 110. In both of these embodiments, media data 116, additional media data, the next data, etc., are streamlined directly to a wireless access card (WAC) of the HMD 104 by the codec 112 of the game cloud 102 via the network 101 and the built-in router. Moreover, in these embodiments, data, e.g., input data, real-world environment data, etc., is streamed directly by the WAC of the HMD 104 to the codec 112 of the game cloud 102 via the built-in router and the network 110. The WAC in conjunction with the built-in router of the HMD is able to transmit the streaming media data and the input data to and from the HMD.

Figure 1B:
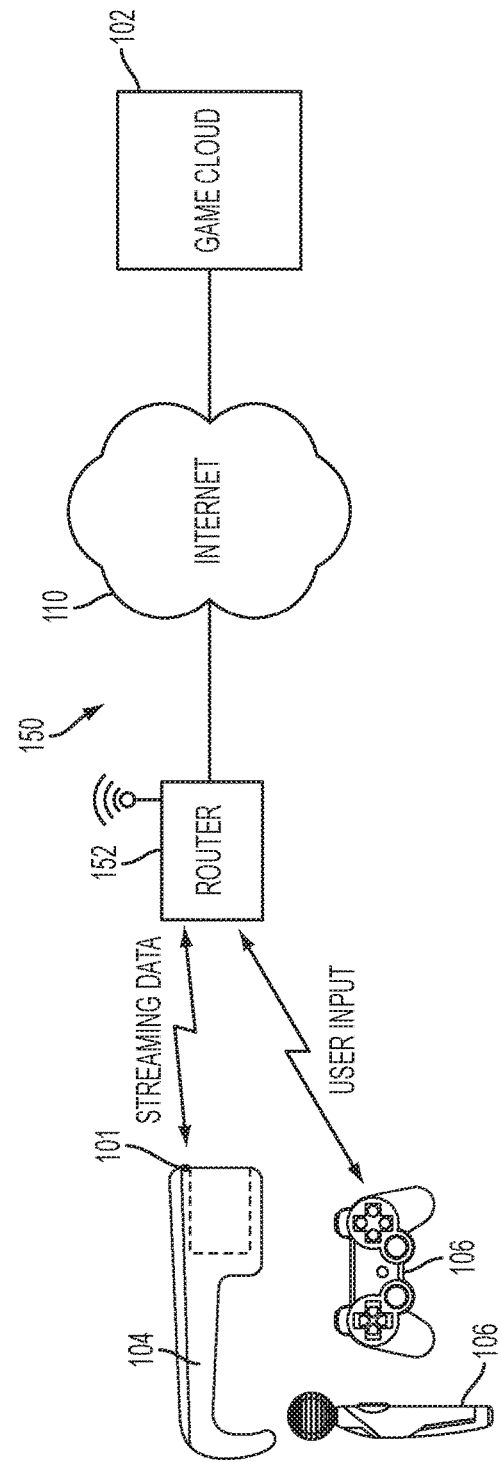

FIG. 1B is a diagram of an embodiment of a system 150 for transferring data between the HMD 104 or the HHC 106 and the game cloud 102 via the network 110 and a router 152. The system 150 is similar to the system 100 (FIG. 1A) except that the system 150 includes the router 152 between the HMD 104 and the network 110. The router 152 is also located between the HHC 106 and the network 110. In this embodiment, the WAC of the HMD 104 will interface with the router 152 to communicate with the network 110.

The HMD 104 is coupled to the router 152 via a wireless connection, e.g., a Bluetooth connection or a Wi-Fi connection, etc. Moreover, the HHC 106 is coupled to the router 152 via a wireless connection. In some embodiments, the router 152 is coupled to the network 110 via a wired connection.

The system 150 illustrated in FIG. 1B operates in a similar manner to that of the system 100 (FIG. 1A) except that a stream of encoded data is sent from the HMD 104 or the HHC 106 to the router 152. The router 152 routes, e.g., directs, etc., the stream of encoded data to a path in the network 110 to facilitate sending the stream to the codec 112. The router 152 uses the IP address of the codec 112 to route the stream of encoded data to the codec 112. In some embodiments, the router 152 determines a network path of the network 110 based on network traffic factor, e.g., packet traffic on the network path, congestion on the network path, etc.

The router 152 receives a stream of encoded data from the game cloud 102 via the network 110 and routes the stream of encoded data to the HMD 104. For example, the router 152 routes the stream of encoded data received from the game cloud 102 via the network 110 to the HMD 104 based on the IP address of the HMD 104. In some embodiments that use the systems 100 and 150, the game execution occurs mostly on the game cloud 102. In some embodiments, some part of the game may execute on the HMD 104 while the remaining portions may execute on the game cloud 102.

Figure 1C:
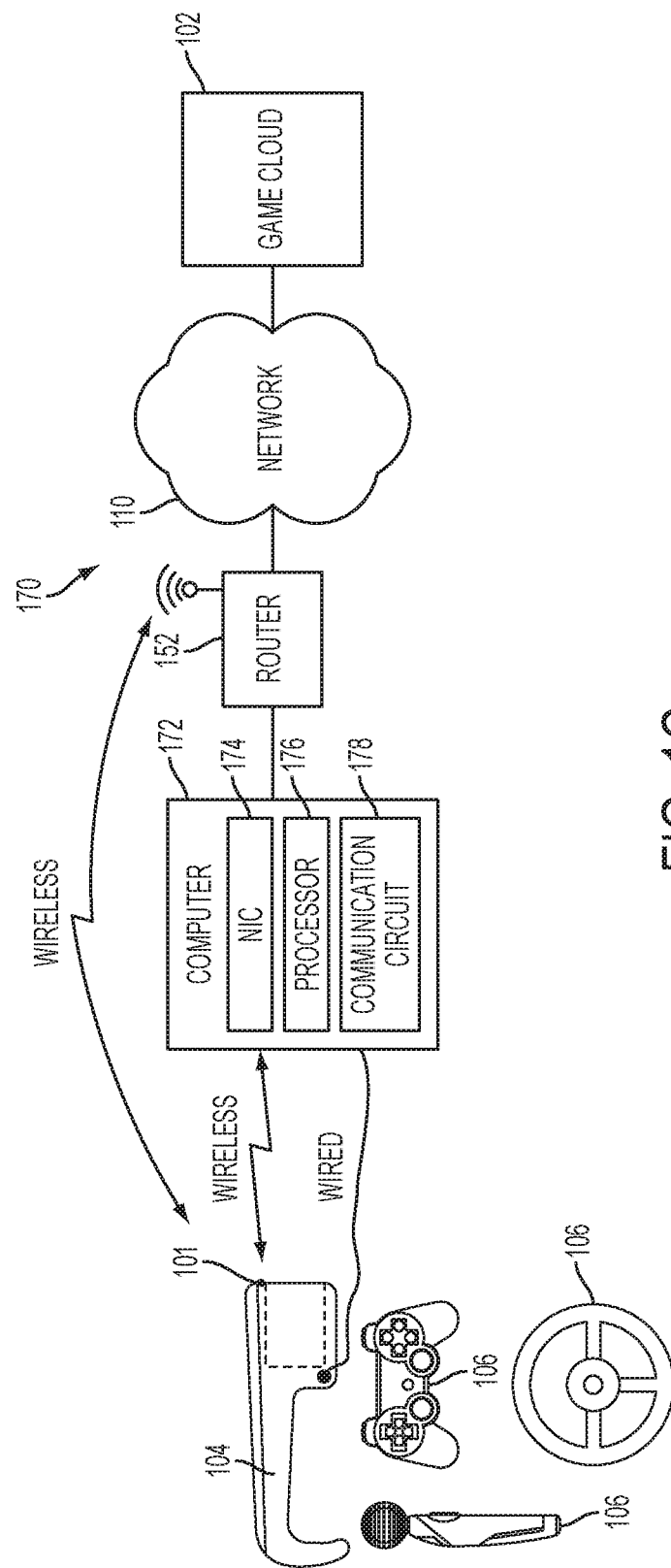

FIG. 1C is diagram of an embodiment of a system 170 for using a computer 172 for communicating media data to the network either directly or through the router 152.

In some embodiments, a list of wireless networks is rendered on the screen of the HMD 104 for user selection. Alternately, in some other embodiments, a list of wireless networks is presented on a display screen associated with the computer 172. For example, when the computer 172 is a mobile phone, the mobile phone includes a display screen for displaying the list of wireless networks. As another example, when the computer 172 is coupled to a television display screen, the list of wireless networks is displayed on the television display screen. In these embodiments, the list of wireless networks is accessed when the processor of the computer 172 executes the wireless access application stored within a memory device of the computer 172. The processor 176 executes the wireless access application when the user 108 generates input data via the HMD 104 or the HHC 106 by performing the head motions and/or hand motions. Input data generated based on the head motions and/or the hand motions are sent from the communications circuit of the HMD 104 or the HHC 106 to the computer 172. When the processor of the computer 172 receives the input data, the wireless access application is executed to generate the list of wireless networks.

The computer 172 includes a network interface controller (NIC) 174 that requests a portion of the game program 117 from the game cloud 102. Examples of a NIC include a network interface card and a network adapter. The portion of the game program 117 is encoded by the codec 112 and streamed via the network 110 to the NIC 174 of the computer 172. A processor 176 of the computer 172 executes the portion of the game program 117 to generate media data, which is sent from a communications circuit 178, e.g., transceiver, Transmit/Receive circuit, a network interface controller, etc., of the computer 172, to the HMD 104 for display on the display screen of the HMD 104. A communications circuit of the HMD 104 receives the media data from the computer 172 and sends the media data to the microcontroller of the HMD 104 for processing and displaying the media data on the display screen of the HMD 104.

Moreover, the communications circuit 178 of the computer 172 receives input data generated based on the head motions from the HMD 104 and/or the hand motions from the HHC 106 and sends the input data to the processor 176. The input data, in one embodiment, may be real-world environment data received from the communications circuit of the HMD 104. The processor 176 executes the portion of the game program 117 that is stored within the computer 172 to generate additional media data, which is sent from the communications circuit 178 to the communications circuit of the HMD 104. Before or after receiving the additional media data, input data from the HHD 104 and/or the HHC 106 that is generated as part of the game play using head motions and/or the hand motions, is sent by the communications circuit of the HMD 104 to the processor 176 via the communications circuit 178. In response to the input data, the processor 176 executes the portion of the game program 117 that is stored within the computer 172 to generate the next media data, which is sent from the communications circuit 178 to the communications circuit of the HMD 104. The next media data is sent to the communications circuit of the HMD 104 to change the game play, including changing/updating virtual game objects and/or virtual environment of a game displayed by execution of the game program 117. When the game objects, e.g., real world objects, virtual game objects, etc., and/or virtual environment changes, a game state of the game displayed by execution of the game program 117 changes.

In some embodiments, the game state is sent by the NIC 174 of the computer 172 via the router 152 and the network 110 to the game cloud 102 to inform one or more servers of the game cloud of the current game state.

In various embodiments, media data 116, additional media data, next media data, etc., are initially sent from the codec 112 via the network 110 and the router 152 to the HMD 104 until a portion of the game program 117 is downloaded to the computer 172 from the game cloud 102. For example, initially, the user 108 uses the game access application to access the game program 117. When the game program 117 is accessed, the media data 116, the additional media data, the next media data, etc., is sent from the codec 112 via the network 110 and the router 152 to the HMD 104 for display on the display screen of the HMD 104. During the time of access of the media data from the game cloud 102 for display on the HMD 104, the NIC 174 of the computer 172 downloads a portion of the game program 117 from the game cloud 102 via the network 110 and the router 152.

In some embodiments, when the game program 117 is accessed by the computer 172, media data, e.g., the media data 116, the additional media data, the next media data, etc., is sent from the codec 112 via the network 110 directly to the HMD 104 for display on the display screen of the HMD 104 by bypassing the computer 172 while the computer accesses the game program on the game cloud for downloading. The received media data is rendered on the display of the HMD 104. Meanwhile, the NIC 174 of the computer 172 downloads a portion of the game program 117 from the game cloud 102 via the network 110 and the router 152.

In a number of embodiments, a portion of input data generated based on the head motions and/or hand motions and/or a portion of the real-world environment data is sent from the HMD 104 via the router 152 and the network 110 to the codec 112 of the game cloud 102 while the remaining portion of the input data and/or the remaining portion of the real-world environment data is sent from the communications circuit of the HMD 104 to the communications circuit 178 of the computer 172.

In various embodiments, a portion of input data generated based on the hand motions is sent from the communications circuit of the HHC 106 via the router 152 and the network 110 to the codec 112 of the game cloud 102 and the remaining portion of the input data is sent from the communications circuit of the HHC 106 to the communications circuit 178 of the computer 172 either through the HMD or directly.

In various embodiments, media data, e.g., the media data 116, the additional media data, the next media data, etc., that is generated by executing the game program 117 using the user input received from the computer/HMD/HHC, is sent from the codec 112 of the game cloud 102 via the network 110 and the router 152 to the HMD 104 for rendering on the display screen of the HMD 104 as part of game play and media data that is generated by execution of the portion of the game program 117 by the processor 176 of the computer 172 is sent from the communications circuit 178 of the computer 172 to the HMD 104 for display on the display screen. In these embodiments, the game cloud 102 and the computer 172 have synchronized game states. For example, the codec 112 sends a game state generated by execution of the game program 117 via the network 110 and the router 152 to the NIC 174 of the computer 172 to inform the computer 172 of the game state. As another example, the NIC 174 of the computer 172 sends a game state generated by execution of the portion of game program 117 on the computer 172 via the router 152 and the network 110 to the codec 112 of the game cloud 102 to inform the one of more game cloud servers of the game state. The communication between the codec 112 of the game cloud 102 and the NIC of the computer are done periodically to keep the game states synchronized on both sides.

In several embodiments, media data, e.g., the media data 116, the additional media data, the next media data, etc., that is generated by executing the game program 117 and sent from the codec 112 of the game cloud 102 to the HMD 104 has a higher amount of graphics than media data that is generated by the processor 176 of the computer 172. As is evident, in some of the embodiments, the computer 172 is bypassed when the media data is directly sent from the codec 112 of the game cloud 102 via the network 110 to the HMD 104.

Figure 1D:
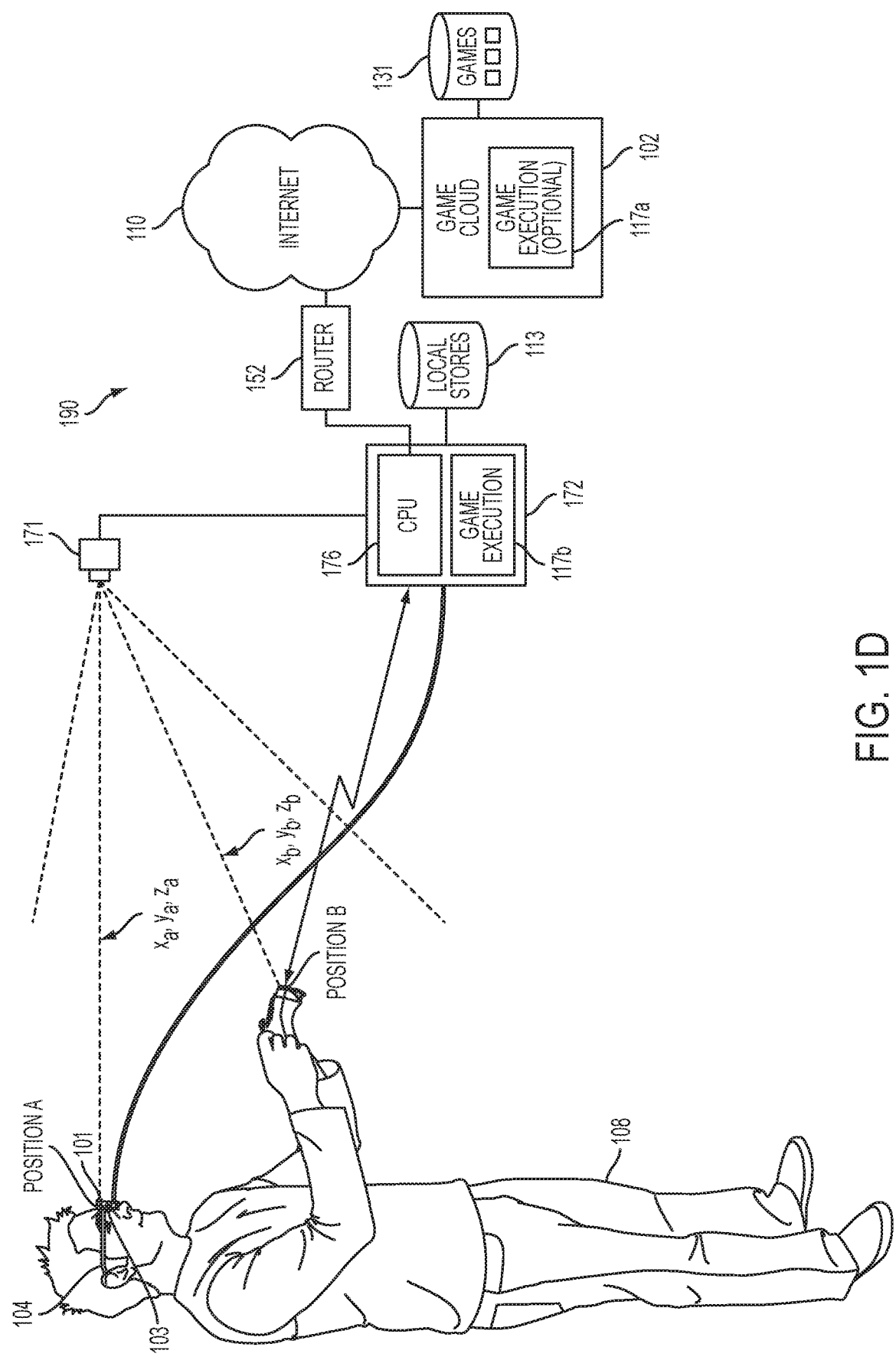

FIG. 1D illustrates a system configuration where the HMD communicates input data and/or media data to/from the codec 112 using a computer 172 and a router 152. The configuration of the system 190 is similar to the configuration of system 170 described with reference to FIG. 1C. The system 190 includes a computer 172 that is communicatively connected to the game cloud 102 through the router 152 and the internet 110 and is configured to obtain portions of the game program and game related data. The computer is also communicatively connected to the HMD 104 and the HHC 106 to obtain input data.

In some embodiments, a processor of the computer 172 executes a wireless access application stored within a memory device of the computer 172 to access the network 110. In some embodiments, the wireless access application is executed in response to input data received from a user via the HMD 104 or the HHC 106. The input data may include head motions and/or hand motions. When the processor of the computer 172 receives the input data generated by the HMD or the HHC, the wireless access application generates a list of available wireless networks from which a network is selected to access the network 110.

The computer 172 includes a network interface controller (NIC) 174 that requests a portion of the game program 117 from the game cloud 102 and in response, the portion 117-b of the game program 117 encoded by the codec 112 is streamed via the network 110 to the NIC 174 of the computer 172. In some embodiments, the game cloud includes a games database 131 from which the game program 117 is retrieved and downloaded to the computer 172. In some embodiments, a portion 117-a of the game program 117 is downloaded from the games database 131 on to the game server 102 and the remaining portion 117-b of the game program 117 is downloaded to the computer 172. In some embodiments, the portion 117-b that is downloaded to the computer 172 is the entire game. The processor 176 of the computer 172 executes the portion 117-b of the game program 117 to generate media data, additional media data and next media data (collectively termed 'media data') which is sent from a communications circuit 178, a network interface controller, etc., of the computer 172, to the HMD 104 for display on the display screen of the HMD 104.

The additional media data and next media data may be provided in response to input data, including head motions/other user input, hand motions, etc., received from the HMD 104. In addition to the head motions and/or hand motions the input data, in one embodiment, may also include real-world environment data that is captured by an external camera 101 disposed on the outside face of the HMD 104 and transmitted by the communications circuit of the HMD 104. In some other embodiment, the real-world environment data captured by the external camera 101 is stored locally within the HMD and used in rendering on the HMD screen. The additional media data provides virtual environment related data for rendering the virtual game scenes on the HMD and the next media data provides changes to virtual game objects and/or virtual environment displayed within the virtual game scenes during game play. A communications circuit of the HMD 104 receives the media data as a media stream from the computer 172 and sends the media data to the microcontroller of the HMD 104 for interpretation and display on the display screen of the HMD 104. When the game objects, e.g., real game objects, virtual game objects, etc., and/or virtual environment changes, a game state of the game displayed by execution of the game program 117, changes.

As mentioned earlier, in some embodiments, the game state is sent by the NIC 174 of the computer 172 via the router 152 and the network 110 to the game cloud 102 to inform one or more servers of the game cloud 102 of the game state so as to synchronize the game state with the game state on the computer 172. In these embodiments, most of the game execution occurs on the computer 172.

In some embodiments, a portion 117-a of the game program 117 is executed on the game cloud 102 while the game program 117 is being downloaded on to the computer 172. Accordingly, media data associated with the execution of the portion 117-a of the game program 117 on the game cloud 102, are sent directly from the codec 112 via the network 110 and the router 152 to the HMD 104 for rendering on the HMD until the portion 117-b of the game program 117 is downloaded to the computer 172 from the game cloud 102. In one embodiment, the portion 117-b of the game program 117 is downloaded and stored in the local storage 113 of the computer 172 and executed by the processor 176. Once the portion 117-b is downloaded and the processor 176 of the computer 172 starts executing the game portion 117-b, the media data will be transmitted from the computer 172 to the HMD 104 for the portion 117-b of the game program 117. In some embodiments, all the media data for the game program are transmitted directly from the computer 172 to the HMD 104 for rendering. The computer 172 may also periodically transmit the media data to the game cloud 102 to synchronize the game state of the game program on the game cloud 102 with the game state on the computer 172.

In a number of embodiments, a portion of input data based on the head motions and/or hand motions are captured by an observation camera 171 that is connected to the computer 172. In some embodiments, the connection between the observation camera 171 and the computer 172 may be a wired connection. In other embodiments, the connection between the observation camera 171 and the computer 172 may be a wireless connection. In some embodiments, the observation camera 171 is any one or combination of stereo camera, IR camera or mono-camera. In some embodiments the observation camera 171 is one of a video camera or a still-motion camera. The images captured by the observation camera 171 may be used to determine the location and motion of the HMD and the HHC. For example, the images of the observation camera 171 may be used to identify coordinates of position A for the HMD $(X_a, Y_a, Z_a)$ and coordinates of position B for the HHC $(X_b, Y_b, Z_b)$. In addition to the coordinates of the coordinate plane, the images of the observation camera may be used to determine the pitch, the yaw and the roll to generate the six-axis data for the HMD and HHC. In some embodiments, the head and/or hand motions generated at the HMD and the HHC are captured by the observation camera 171 and transmitted to the microcontroller of the HMD 104 as six axis data. The six-axis data from the HMD 104 and/or HHC 106 are interpreted to generate the input data. The interpreted input data is transmitted from the HMD 104 to the computer 172 to influence the outcome of the game program. In some embodiments, the head and/or hand motions captured by the observation camera 171 are directly transmitted to the processor 176 where it is interpreted to generate the six-axis data. The observation camera 171 observes the motions (head and/or hand) of the user and this information is used in providing feedback to the game program to influence the game state changes. In this embodiment, any other input data related to the game program 117 are transmitted by the HMD 104 to the processor and the processor 176 interprets the other input data with the six-axis data to determine if the game state of the game needs to be altered. Based on the interpretation, the game state of the game is changed. In some embodiments, the input data from the HMD 104 includes real-world environment data captured by the external camera 101 and sent from the communications circuit of the HMD 104 to the communications circuit 178 of the computer 172. The real-world environment data may be used to influence the virtual game scenes rendered at certain portions of the screen of the HMD 104.

In some embodiments, the HMD 104 is communicatively connected to the computer 172 using a wired connection. In such embodiments, the HMD is configured to detect a break in the wired connection so as to pause the virtual game scenes rendered on the screen of the HMD 104. The HMD detects a break in the communication connection, generates a signal accordingly and relays the signal to the computer 172 to cause the computer 172 to pause the execution of the game program and to store the game state and game scenes for the session for the game. Power from a battery of the HMD may be used to provide the power for communicating with the computer 172 during the break in the communication connection, the status of the connection. The execution of the game program may resume as soon as the computer 172 gets a signal from the HMD 104 that the wired connection has been re-established. In some embodiments, upon resumption of the connection between the HMD and the computer 172, the computer 172 may start streaming the game scenes from the point of disruption. In another embodiment, the computer 172 may start streaming the game scenes from a point before the pause (for example, few hundred frames before the pause) caused by the connection disruption so that the user may get some time to immerse in the game. In this embodiment, the computer 172 may allow the user to re-execute portions of the game to allow the user to get into the game. The communication between the HHC and the HMD and the communication between the HHC and the computer 172 may follow a wireless communication protocol.

In some embodiments, the HMD 104 may include one or more internal cameras 103 to detect changes in the user's eyes movement. The internal cameras 103 may also be used to identify/authenticate the user before providing access to the game.

Although detailed description is provided regarding a gaming environment, it is envisioned that the interfacing can also take place during interactive communication with a computer system. The computer system can be a general computer, with a graphical user interface that allows user 108 to present and make gestures in space, that control icons, entry, selection, text, and other commands.

FIGS. 2A-2D illustrate block diagrams of a head mounted display (HMD) 104 depicting various views and aspects that are used to communicate program related media data to and from the game cloud 102 and/or computer. The HMD 104 is configured to display computer generated image (i.e., virtual image) for a game program 117 that is partially or fully executing on a computer 172, and/or that is partially or fully executing on the game cloud by decoding the media data received at the HMD. The HMD is also configured to code the media data generated or received at the HMD before transmitting to the computer and/or game cloud for updating the executing game program. The HMD is also configured to display real-world environment images captured from the perspective of the user.

Figure 2A:
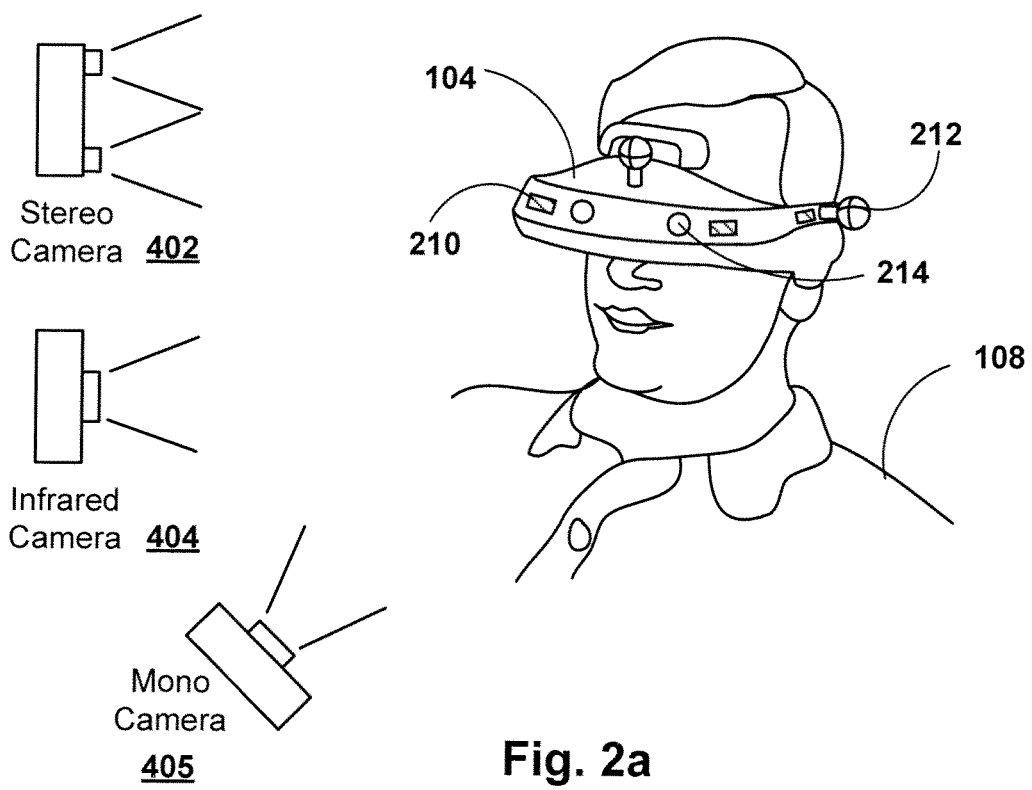
FIGS. 2A-2D illustrate components of head mounted display used in the interaction with a game program, in accordance with embodiments of the invention.

FIG. 2A illustrates an exemplary HMD 104 used for generating input data and for rendering game scenes and real-world environment scenes. As shown, the HMD 104 is worn by a user 108. The HMD 104 includes one or more marker elements that assist in the visual tracking of the HMD. Similarly, the HHC 106 (not shown) includes one or more marker elements that are similar to the marker elements provided on the HMD. Each marker element may be a light emitting diode 214, an infrared light 210, a color, a reflective material, an object with special features or characteristics that are easily recognized via image analysis, etc. For example, a spherical object 212 may be added to the HMD for easy tracking. In addition, the spherical object 212 may also be illuminated with LED light, infrared light, or any other type of illumination. In addition, the HMD 104 may also include special visual markers (not shown), such as reflective areas of particular geometrical shape, areas with a particular color (e.g., blue rectangle, etc.), or markings (e.g., three parallel lines on the surface of the HMD).

In some embodiments, the HMD also includes additional marker elements on the side and/or back of the HMD (i.e., the part of the HMD touching the back of the head) to further visually track the location of the HMD by detecting the respective lights or visual markers.

The visual tracking of the HMD may be enabled with different types of external cameras. In some embodiments, the cameras are observation cameras 171 (of FIG. 1D). In one embodiment, the HMD is tracked with a stereo camera 402, which is a camera that includes two or more lenses with separate image sensor for each lens. The separate image sensor enables the stereo camera to capture three-dimensional images of an object that provide an illusion of depth. The stereo cameras optics are designed, in one embodiment, to be set to optical infinity (for example, about 9 meters) to provide the stereoscopic images. Images of the marker elements of the HMD captured by the different lenses of the camera are compared using triangulation analysis to determine the location of the HMD in the three-dimensional space (for e.g., the calculation of the depth within the field of play).

In another embodiment, an infrared (IR) camera 404 may be used to analyze infrared light 210 provided on the HMD. The infrared light is not visible to the human eye but can be easily detected by the infrared camera. The HMD may include infrared lights to avoid distraction in the appearance of the HMD. In some environments (e.g., low light or bright light), it may be easier to track infrared light than other types of lights for detecting location, shape and or features in the HMD. The infrared (IR) cameras provide enhanced imaging and thermal imaging of a tracking object, such as the HMD. The IR cameras may also be used as internal cameras to detect user's gaze direction.

In yet another embodiment, a regular camera 405, also referred to herein as a mono camera because it has only one lens, is used to track the lights or other marker elements in the HMD that are configured for visual tracking. In order to determine the depth of the HMD within the field of play with the regular camera, the size of some of the features on the HMD are analyzed. The smaller the features are, the further away the features are supposed to be from the camera of the HMD. In addition, the visual tracking may also be combined with other types of tracking, such as inertial motion tracking, dead reckoning, ultrasound communication between the HMD and the computing device, etc.

The digital camera 402 captures an image of the HMD 104. When the head of the user 108 tilts or moves, position and location of the marker elements changes in a coordinate system. The digital camera captures an image of the marker elements and sends the image to the computer 172. An image of the marker elements is an example of input data. Position of the HMD 104 in a three dimensional space (X, Y, Z) can be determined by the processor 176 of the computer 172 based on the positions of the marker elements in the images. Further, inertial motion, e.g., yaw, pitch, and roll, etc., of the HMD 104 is determined by the processor 176 of the computer 172 based on movement of the marker elements. In the cases where the computer 172 is not available, the image of the marker elements from the digital camera are sent to the processor of the HMD 104 and the HMD's processor will determine the position of the HMD using the coordinates of the marker elements.

In some embodiments, the digital camera 402 captures an image of the HHC 106. When the hand of the user 108 tilts or moves, position and location of the marker elements on the HHC changes in a co-ordinate system. The digital camera captures an image of the marker elements on the HHC and sends the image to the computer 172 or to the processor of the HMD 104. An image of the marker elements on the HHC is an example of input data. Position of the HHC 106 in a three dimensional space (X, Y, Z) can be determined by the processor 176 of the computer 172 or by the processor of the HMD 104 by analyzing the positions of the marker elements on the HHC in the image. Moreover, inertial motion, e.g., yaw, pitch, and roll, etc., of the HMD 104 is determined by the processor 176 of the computer 172 or the processor of the HMD 104 based on movement of the marker elements of the HHC.

In some embodiments, instead of the HHC 106, a hand of the user 108 may be tracked by the digital camera and the tracked data may be used to determine the position of the hand in three dimensional space and the inertial motion of the hand. In some embodiments, an interactive glove may be used instead of the HHC 106. The glove may include marker elements to track and interpret the motion of the different portions of the user's hand wearing the glove.

For more information regarding method for following a marked object, reference may be made to U.S. Patent Application Publication No. 2012-0072119, filed on Aug. 15, 2011 and published on Mar. 22, 2012, and U.S. Patent Application Publication No. 2010-0105475, filed on Oct. 27, 2008 and published on Apr. 29, 2010, both of which are herein incorporated by reference.

As shown, one or more pairs of stereo camera 402, one or more infrared cameras 404 and/or one or more mono camera 405 or combinations thereof may be used to determine the relative position of the HMD and the motion of the HMD provided by user's head motion as well as the controller, including the user's hand wearing a wearable article/device that is used to provide input data.

The HMD may also be equipped with one or more internal cameras mounted on the inside to capture images related to the user and feed the images to the communication module to provide user specific and environment specific data to the HMD. The internal camera(s) may be used to identify a user wearing the HMD, which can be used to obtain user profile of the user. Accordingly, the internal cameras may be configured to engage retinal scanning technique and/or iris scanning technique to scan the user's retina or irises and use the data from the scanning to generate at least one biometric identity of the user. The user's biometric identity may be part of the user's profile. The internal cameras also include a gaze detector algorithm to detect the direction of the user's gaze and to adjust the image data rendered on a screen of the HMD based on the detection. In some embodiments, the internal cameras are IR cameras. The gaze detection technology may also be used to authenticate a user. For example, the user may be asked to follow an object rendered on the screen or track a randomly generated letter, object or pattern (for e.g., a circle, a triangle, a rectangle, etc.) that is rendered on the screen. In some embodiments, verbal or textual commands may be provided for a user to track a letter, an object or pattern on the screen and the user authenticated by using the gaze detection technology. The authentication of a user may be used to allow access to a user account, to a game, to certain parts or levels of a game, etc.

Figure 2B:
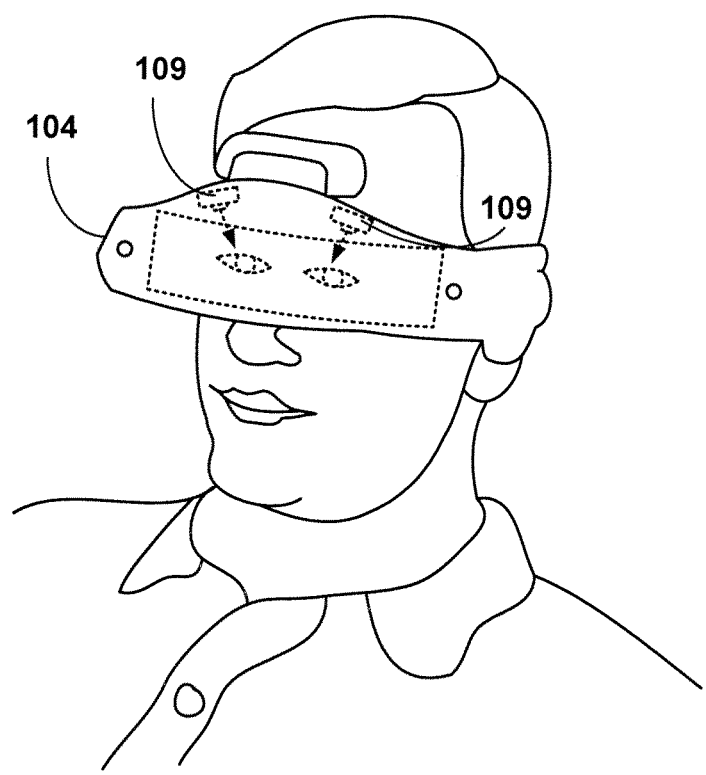

FIG. 2B illustrates a user wearing the HMD 104 with the internal cameras 109 (103 of FIG. 1D) for detecting the biometric identity of the user and the eye movement of the user.

The internal cameras (109 of FIG. 2B and 103 of FIG. 1D) and the external cameras (101 of FIG. 1D) work hand-in-hand to determine the gaze of the user and to relate the gaze to an object in the line-of-sight of the user's gaze. The game processing module of the HMD includes the software to compute the direction of the user's gaze and correlate it to objects within the field of view of the computed direction.

The HMD includes one or a pair of display screens in front of one or each eye. The display screen(s) are miniature screens that include cathode ray tubes (CRTs), liquid crystal displays (LCDs), liquid crystal on silicon (LOC) or organic light emitting diodes (OLEDs), to name a few.

Figure 2C:
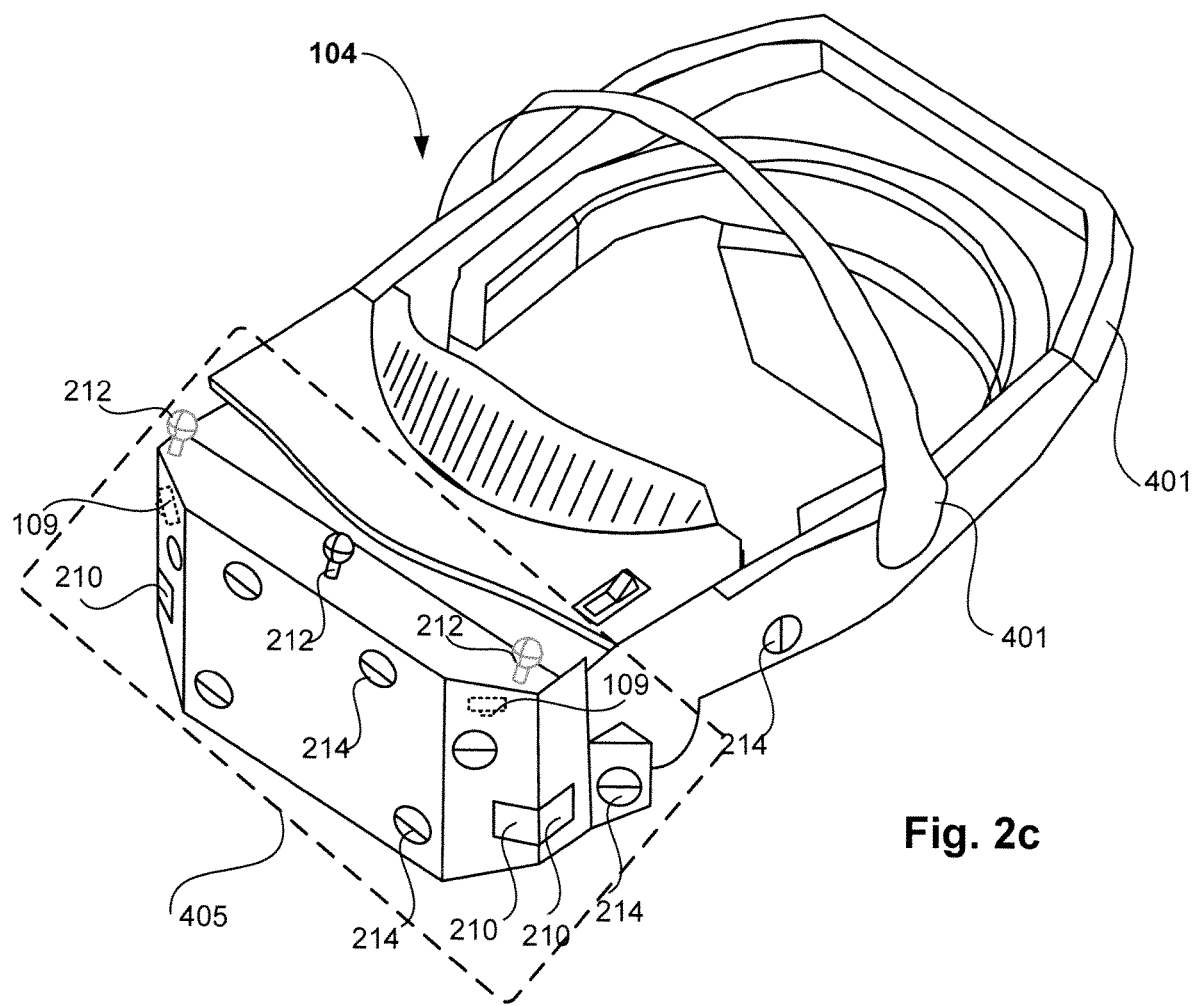

FIG. 2C illustrates a block diagram rendition of a simplified HMD used in various embodiments of the invention. The HMD may include one or more anchor straps 401 to allow the HMD to fit securely over a user's head and a front face plate 405. The front face plate 405 includes a screen portion with screen disposed on the inside and one or more internal camera units (109) disposed thereon. In addition to the internal camera units (i.e., inside mounted cameras), one or more external camera units (i.e., outside mounted cameras) (not shown) may also be disposed on the HMD to capture real-world environment as seen from the user's perspective. The external camera units are in addition to observation camera 171 that are used to detect the motion of the HMD and the HHC. The face plate of the HMD includes a plurality of marker elements including one or more light emitting diodes 210, one or more infrared lights 214 and one or more spherical objects 212, a colored surface, a reflective material, objects with special features or characteristics that are easily recognized via image analysis, etc. During game play, image of the marker elements on the HMD are captured by the one or more observation camera(s) and coordinates data from the captured image are used to determine the location, movement and positon of the HMD. The observation camera(s) may be connected to the HMD directly or through a computer 172 and configured to exchange data related to the captured image with the HMD and/or with the computer 172. When transmitted to the HMD, the processor within the HMD processes the data to identify the six-axis data of the HMD and transmits the processed data to the computer 172 and/or to the game cloud 102 through the computer 172 (when present) and router, through the router and network, or directly as input data from the HMD. The input data influences or affects the game state of the game program.

The internal cameras 109 detect and track the user's eye movement and gaze. The internal cameras 109 may be used to determine the user's gaze direction for a period of time (for e.g., when the user who was looking straight looks down for some period of time), detect a gaze pattern over a period of time (for e.g., when a user follows an object, traces a pattern, etc.), and/or detect changes in gaze directions (for e.g., back-and-forth movement of the eyes, rolling of the eyes—which may be a sign of the user experiencing dizziness—especially in a high intensity game, etc.). The HMD's internal cameras communicate with the HMD's external cameras and with the observation cameras to determine appropriate game-related data for rendering on the screen of the HMD. This communication will enable rendering of the user/environment related data alongside or in place of the game-related data on the screen of the HMD, in response to certain triggered events.

Figure 2D:
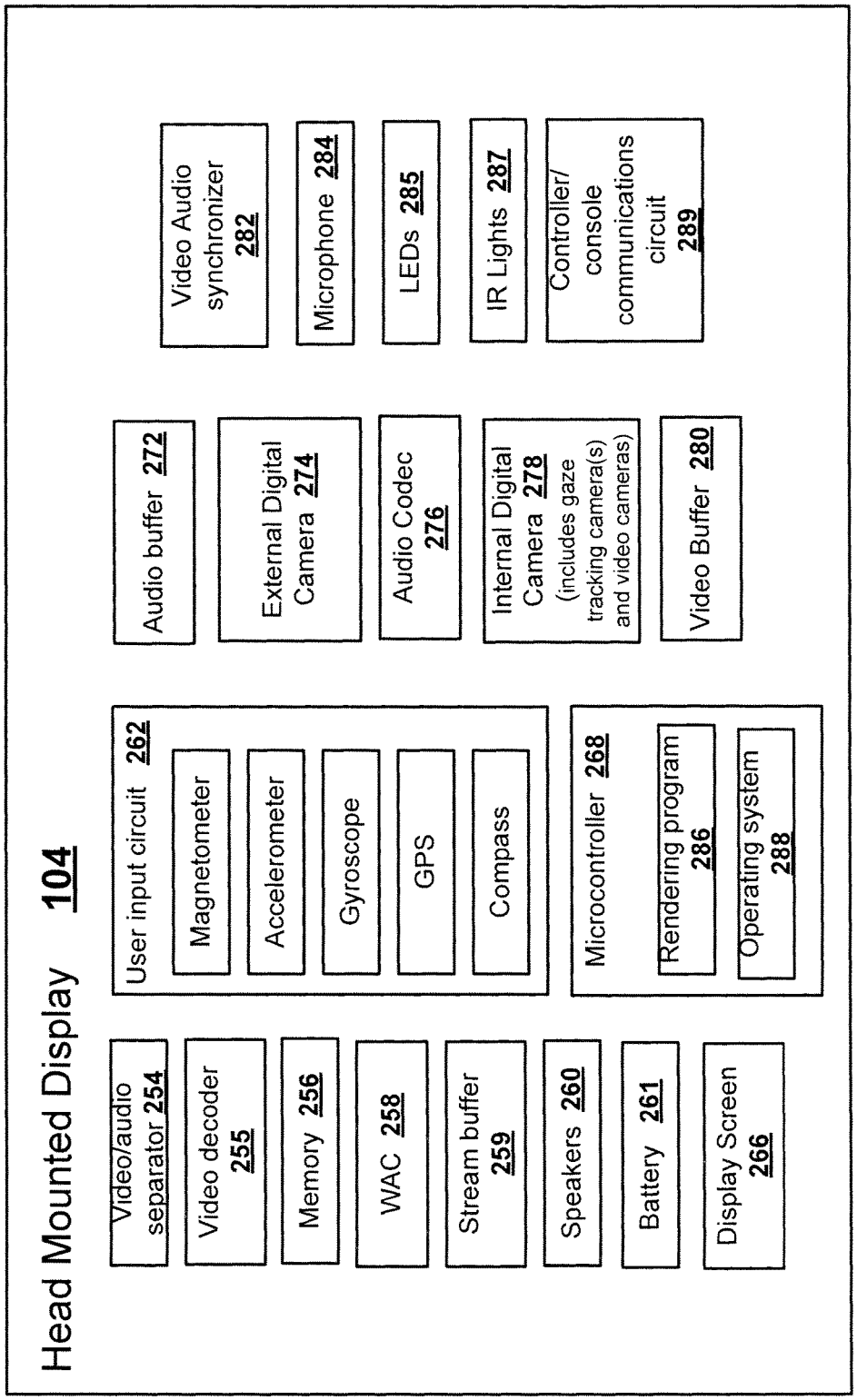

FIG. 2D is a block diagram of a communication architecture of an HMD 104. The HMD 104 includes some exemplary modules, such as a video audio separator 254, a video decoder 255, a memory device 256, a WAC 258, a stream buffer 259, one or more speakers 260, a battery 261, a user input circuit 262, a display screen 266, a microcontroller 268, an audio buffer 272, an observation digital camera 274, an external digital camera 275 an audio codec 276, an internal digital camera 278, a video buffer 280, a video audio synchronizer 282, a microphone 284, LEDs 285 and IR lights 287. The LEDs 285 and IR lights 287 represent the marker elements that are used to track the position of the HMD.

In a number of embodiments, the speakers 260 form an audio circuit. In various embodiments, the audio codec 276, the audio buffer 272, and/or the speakers 260 form an audio circuit. In various embodiments, the microcontroller 268 is a display circuit that is used for rendering images on a display screen. Examples of a display screen 266 include an LED screen, a liquid crystal display (LCD) screen, a liquid crystal on silicon screen, an organic LED (OLED) screen, a plasma screen, etc. An example of the external digital camera includes a first eye camera, such as Playstation Eye® manufactured by Sony Computer Entertainment, Inc.

The microcontroller 268 stores a rendering program 286 and an operating system 288. The rendering program 286 and the operating system 288 are stored in a memory device of the microcontroller 286 and executed by a microprocessor of the microcontroller 268. An example of microcontroller 268 includes a low cost microcontroller that includes a driver, e.g., an LCD driver, that generates a signal to detect elements (for e.g., LCDs, etc.), to provide media data, for displaying on the display screen 266. Another example of the microcontroller includes a GPU and a memory device.

In some embodiments, the memory device of the microcontroller is other than a flash memory or a random access memory (RAM). For example, memory device of the microcontroller is a buffer. In various embodiments, memory device of the microcontroller is Flash or a RAM. Examples of the user input circuit 262 include a gyroscope, a magnetometer, and an accelerometer. In some embodiments, the user input circuit 262 also includes a global position system (GPS), compass or any location tracking devices. An example of the WAC 258 includes a NIC. In some embodiments, the WAC 258 is referred to herein as a communications circuit.

A stream of encoded media data is received into the stream buffer 259 from the network 110 or the router 152 (FIGS. 1B-1C). It should be noted that when the router 152 is coupled to the computer 172 (FIG. 1C), data received from the computer 172 is stored in a buffer (not shown) of the HMD 250 or in the memory device 256 instead of being stored in the stream buffer 259.

The WAC 258 accesses the stream of encoded media data from the stream buffer 259 received from the computer or the codec 112 and depacketizes the stream. The WAC 258 also includes a decoder to decode the encoded media data.

In embodiments in which the stream of encoded media data is received by the computer 172 (FIG. 1C) via the router 152 (FIG. 1C), the NIC 174 (FIG. 1C) of the computer 172 depacketizes and decodes the stream of encoded media data to generate decoded data, which is stored in the buffer (not shown) of the HMD 250.

The decoded data is accessed by the video audio separator 254 from the WAC 258 or from the buffer (not shown). The video audio separator 254 separates audio data within the decoded data from video data.

The video audio separator 254 sends the audio data to the audio buffer 272 and the video data to the video buffer 280. The video decoder 255 decodes, e.g., the video data and/or changes to the video data from a digital form to an analog form to generate analog video signals. The video audio synchronizer 282 synchronizes the video data stored in the video buffer 280 with the audio data stored in the audio buffer 272. For example, the video audio synchronizer 282 uses a time of playback of the video data and the audio data to synchronize the video data with the audio data.

The audio codec 276 converts the synchronized audio data from a digital format into an analog format to generate audio signals and the audio signals are played back by the speakers 260 to generate sound. The microcontroller 268 executes the rendering program 286 to display a game on the display screen 266 based on the analog video signals that are generated by the video decoder 255. In some embodiments, the game displayed on the display screen 266 is displayed synchronous with the playback of the audio signals.

Moreover, the user 108 (FIGS. 1A-1C) speaks into the microphone 284, which converts sound signals to electrical signals, e.g., audio signals. The audio codec 276 converts the audio signals from an analog format to a digital format to generate audio data, which is stored in the audio buffer 272. The audio data stored in the audio buffer 272 is an example of input data generated based on a sound of the user 108. The audio data may also include other audio signals generated at the HMD or detected by the speakers in the HMD. The audio data is accessed by the WAC 258 from the audio buffer 272 to send via the network 110 (FIGS. 1A-1C) to the codec 112 (FIGS. 1A-1C) of the game cloud 102 (FIGS. 1A-1C). For example, the WAC 258 packetizes and encodes the audio data accessed from the audio buffer 272 to send via the network 110 to the codec 112.

In some embodiments, the audio data is accessed by the WAC 258 from the audio buffer 272 to send via the router 152 (FIGS. 1A-1C) and the network 110 (FIGS. 1A-1C) to the codec 112 (FIGS. 1A-1C) of the game cloud 102. For example, the WAC 258 packetizes and encodes the audio data accessed from the audio buffer 272 to send via the router 152 and the network 110 to the codec 112.

The internal digital camera 278 (103 of FIG. 1D, 109 of FIG. 2B) captures one or more images of the eye motions of the user 108 (FIGS. 1A-1C) to generate image data, which is an example of input data generated at the HMD. based on the head and/or eye motions. Similarly, the observation digital camera 274 (camera 171 of FIG. 1D) and/or the external digital camera 275 (camera 101 of FIG. 1D) mounted on the HMD captures one or more images of markers located on the HMD 250 and/or on the HHC/glove/hand of the user 108, head motions of the user wearing the HMD, to generate image data, which is an example of input data that is generated based on the hand/head motions. The image data captured by the digital cameras 274, 275 and 278 is stored in the video buffer 280.

In some embodiments, the image data captured by the digital cameras 274, 275 and 278 is stored in a buffer of the HMD 250 and the buffer is other than the video buffer 280. In various embodiments, the image data captured by the digital cameras 274, 275 and 278 is decoded by the video decoder 255 and sent to the microcontroller 268 for display of images on the display screen 266.

The image data captured by the digital cameras 274, 275 and 278 is accessed by the WAC (wireless access card) 258 from the video buffer 280 to send via the network 110 (FIGS. 1A-1C) to the codec 112 (FIGS. 1A-1C) of the game cloud 102 (FIGS. 1A-1C, 2). For example, the WAC 258 packetizes and encodes the image data accessed from the video buffer 280 to send via the network 110 to the codec 112.

In some embodiments, the video data is accessed by the WAC 258 from the video buffer 280 to send via the router 152 (FIGS. 1B-1C) and the network 110 (FIGS. 1A-1C) to the codec 112 (FIGS. 1A-1C) of the game cloud 102. For example, the WAC 258 packetizes and encodes the video data accessed from the video buffer 280 to send via the router 152 and/or the network 110 to the codec 112.

The controller/console communications circuit 289 receives media data from the computer 172 for storage in the buffer (not shown). Moreover, the controller/console communications circuit 289 receives input signals from the HHC 106 (FIGS. 1A-1C), converts the input signals from an analog form to a digital form to generate input data, which is accessed by the WAC 258 to send via the network 110 (FIGS. 1A-1C) to the codec 112 (FIGS. 1A-1C) of the game cloud 102 (FIGS. 1A-1C). For example, the WAC 258 packetizes and encodes the input data accessed from the controller/console communications circuit 289 to send via the network 110 to the codec 112.

In some embodiments, the input data is accessed by the WAC 258 from the controller/console communications circuit 289 to send via the router 152 (FIGS. 1B-1C) and the network 110 (FIGS. 1A-1C) to the codec 112 (FIGS. 1A-1C) of the game cloud 102. For example, the WAC 258 packetizes and encodes the video data accessed from the video buffer 280 to send via the router 152 and the network 110 to the codec 112.

It should be noted that instead of the controller/console communications circuit 289, two separate communications circuits may be used, one for communicating, e.g., receiving, sending, etc., data with the computer 172 (FIG. 1C) and another for communicating data with the HHC 106 (FIGS. 1A-1C).

In a number of embodiments, the decoder is located outside the WAC 258. In various embodiments, the stream buffer 259 is located within the WAC 258.

In some embodiments, the HMD 104 excludes the observation digital camera 274. In several embodiments, the HMD 104 includes any number of microcontrollers, any number of buffers, and/or any number of memory devices.

In various embodiments, the HMD 104 includes one or more batteries 261 that provide power to components, e.g., the video audio separator 254, the memory device 256, the wireless access card 258, the stream buffer 259, the one or more speakers 260, the user input circuit 262, the display screen 266 the microcontroller 268, the audio buffer 272, the external digital camera 274, the audio codec 276, the internal digital camera 278, the video buffer 280, the video audio synchronizer 282, and the microphone 284. The one or more batteries 261 are charged with a charger (not shown) that can be plugged into an alternating current outlet.

In a number of embodiments, input data and/or media data is referred to herein as interactive media.

In some embodiments, the HMD 104 includes a communications circuit to facilitate peer-to-peer multichannel communication between local users via pairing. For example, the HMD 104 includes a transceiver that modulates sound signals received from the microphone 284 and sends the modulated signals via a channel to a transceiver of another HMD (not shown). The transceiver of the other HMD demodulates the signals to provide to speakers of the other HMD to facilitate communication between the users.

In various embodiments, different channels are used by the transceiver of the HMD 104 to communicate with different other HMDs. For example, a channel over which the modulated signals are sent to a first other HMD is different than a channel over which modulated signals are sent to a second other HMD.

In some embodiments, the WAC 258, the user input circuit 262, the microcontroller 268 and the video decoder 255 are integrated in one or more individual circuit chips. For example, the WAC 258, the video decoder 255 and the microcontroller 268 are integrated in one circuit chip and the user input circuit 262 is integrated into another circuit chip. As another example, each of the WAC 258, the user input circuit 262, the microcontroller 268 and the video decoder 255 is integrated in a separate circuit chip.

The various modules of the HMD are used to determine an occurrence of a trigger event that necessitates a transition action to be performed and performs the transition at the HMD screen. In some embodiments, the modules within the HMD are collectively termed "Game Processing Module". The game processing module of HMD detects occurrence of a trigger event and allows a HMD view to transition between a "non-transparent" mode, a "semi-transparent" mode, a "simulated transparent" mode and a "fully transparent" mode based on trigger event. In some embodiments, the user may be provided with options to determine which transparent mode transition is desired by the user and the transition is performed in accordance to the option chosen. Based on the transition, the user is able to either partially or fully view the real-world environment and/or the interactive scenes of the game play. It should be noted that when the interactive scene from the game is rendered on the screen of the HMD, the screen is said to be in a "non-transparent" mode.

In some embodiments, based on detection of a trigger event, the game processing module transitions the HMD screen from a non-transparent mode to a semi-transparent mode. In some embodiments, the transition from the non-transparent mode to semi-transparent mode is performed in only a portion of the HMD screen while the remaining portion of the HMD screen continues to be in non-transparent mode. Alternately, the entire HMD screen is transitioned from non-transparent mode to semi-transparent mode. In the semi-transparent mode, some objects of the real-world environment are presented with the interactive scene of a game program currently rendering on the HMD screen. The real-world environment presented at the HMD screen is captured from the immediate vicinity of the user, by a forward facing camera of the HMD. The real-world environment, in one embodiment, is presented such that the interactive scene of the game is rendered in the background and some of the objects from the real-world environment are rendered in the foreground. Alternately, in another embodiment, the interactive scene is rendered in the foreground while some of the objects from the real-world environment are rendered in the background.

In one embodiment, in response to the occurrence of a trigger event, the game processing module transitions the HMD screen from a non-transparent mode, where only the interactive scene of the game is being rendered, to a simulated transparent mode, where a user is exposed to a view of the real-world environment from the user's immediate vicinity. In this embodiment, the game processing module activates and directs a forward facing camera in the HMD to capture and transmit image and/or video of the real-world environment that is in line with the user's gaze, from the vicinity of the user wearing the HMD. The game processing module receives the image/video transmitted by the forward facing camera, processes the image/videos (for e.g., to re-size, re-adjust resolution, etc.), and renders the processed image/videos of the real-world environment on the HMD screen. The rendering causes replacement of the interactive scenes of the game program currently being rendered with the processed image/video. In this embodiment, the simulated transition makes it appear that the game processing module has transitioned the HMD screen to a "fully transparent" mode but, in reality, has provided a simulated transition by presenting an image of the real-world environment captured by the forward facing camera, at the HMD screen.

In another embodiment, the game processing module effectuates the transition between non-transparent (i.e., opaque or dark) mode and fully transparent (i.e., clear) mode, in response to detection of a trigger event, by adjusting optic setting of the HMD screen. In this embodiment, the HMD screen is a liquid crystal display (LCD) screen. The game processing module switches the optic characteristics of the LCD screen between dark/black setting (representing non-transparent mode) and clear setting (representing fully transparent mode). The clear setting enables the user to see through the display screen of the HMD at the real-world objects from the user's immediate surrounding environment, in a manner that is similar to viewing through a clear glass screen. In the opaque/dark setting, the user is unable to or is hard to view through the display screen. In the non-transparent mode (i.e., opaque/dark setting), the interactive scenes of the game are rendered in the display screen of the HMD. The adjustment of the optic setting for transitioning between non-transparent mode to fully transparent mode is done from behind the LCD screen. Of course, the optics of the LCD screen of the HMD needs to be inverted when facing outwards.

In one embodiment, the trigger event is analyzed to determine if a mode transition is warranted and the mode transitioning is effectuated, including inversion of optics, based on the determination. For example, the analysis may determine if a user's gaze shift is for a period long enough to warrant a transition in mode and the mode transition is effectuated when the gaze shift is for a period that is at least equal to a pre-defined threshold period. Thus, the game processing module provides alternate ways to transition between non-transparent mode and a transparent mode to allow the user to view the real-world environment either partially or fully from time to time, depending on the trigger events while allowing the user to immerse in the game play experience trigger event. The transparent mode may be any one or combination of semi-transparent mode, simulated transparent mode and fully transparent mode.

Some exemplary trigger events that cause the transition from the non-transparent mode to semi-transparent, simulated transparent or fully transparent mode may include any one or a combination of shift in gaze of a user wearing the HMD, voice command, action detected at the HHC/HMD including button press, touch-screen interaction, gesture, interaction through one or more input mechanism/device, etc., sound or movement detected in the immediate surrounding of the user, detecting receipt of a phone call, text, ping, message, email, detecting action of other users in the vicinity of the user, such as voice, etc.

This form of transitioning by manipulating what is being rendered on the screen allows the user to switch from being in a fully immersed state to a partially immersed or non-immersed state. The transition from the non-transparent mode to the semi-transparent, simulated transparent or fully transparent mode enables the user to view the real-world environment either partially or fully from time to time while continuing to immerse in the game play. In some other embodiments, the transition from the non-transparent mode to a transparent mode (either semi-transparent, simulated transparent or fully transparent) provides the user with the ability to transition from a fully immersed state to a complete non-immersed state. In some embodiments, the transitioning from non-transparent to transparent mode is provided as an option and the user may choose or not choose to transition.

The transition is enabled by detecting occurrence of an event during the execution of the game. The occurrence of an event, for example, may be determined by identifying and observing a gaze condition of the user's eyes that is wearing the HMD. The observation of the gaze condition may include detecting a gaze direction of the user for a period of time to see if the gaze has shifted over time, detecting a gaze pattern over a period of time to determine if the user is tracking a pattern, switching of gaze from a first position to a second position back to first position repeatedly, detecting changes in gaze directions to determine if the user is experiencing dizziness, etc. The observation of the gaze condition is correlated with the pre-defined actions provided by the HHC, the HMD, the game cloud and/or computer (if present) in order to determine if transition has to be performed. The actions provided by the HHC or HMD may also include feedback to the game program, such as tactile feedback, audio feedback, etc., in addition to the move actions. The user's gaze condition may be tracked using one or more internal camera units.

Figure 3A:
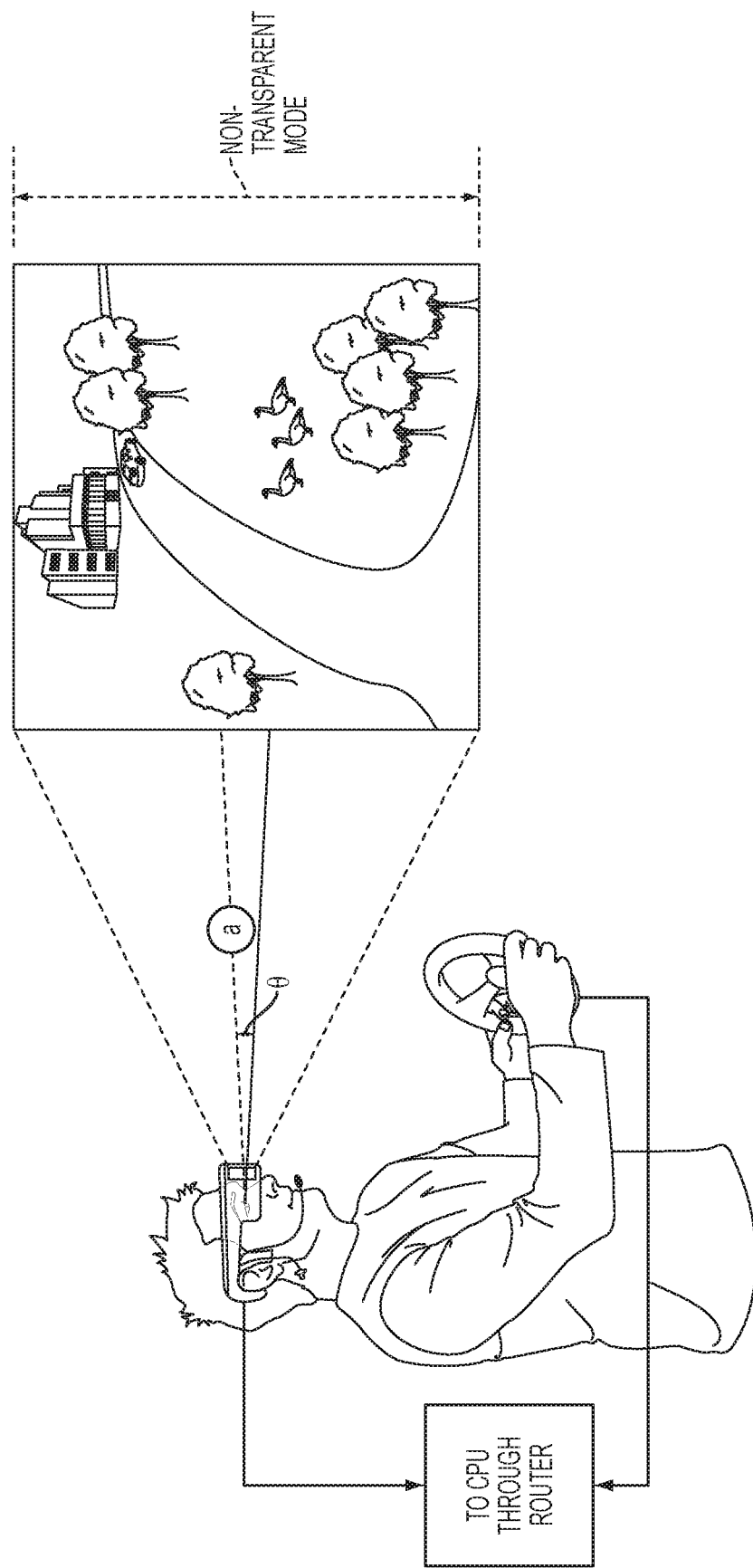

During the tracking, if it is determined that the user's gaze continues to be on a portion/region on the screen that is rendering interactive scenes for the game that directly correlates with the actions provided by the HMD, the HHC and/or the game program, then the screen continues to exhibit interactive scenes for the game play streaming from the game program, in a non-transparent mode. FIG. 3A illustrates one such embodiment, wherein the tracking by the internal cameras detects the user's gaze to be fixed on the interactive scenes being rendered on the screen at a gaze angle illustrated by line 'a' defined at angle 'θ' from a normal line. In response to this detection, the game processing module of the HMD will continue to render interactive scenes related to the game program streaming from the computer or game cloud that correlates with the gaze angle, on the screen of the HMD. However, if the inside-mounted camera(s) detects change in gaze condition, for e.g., shifting in the user's gaze to a different portion of the screen, the internal camera(s) will detect the change in the gaze condition, i.e., gaze shift, and determine the angle of gaze shift. Multiple inside-mounted cameras may be used to precisely determine the coordinates of the gaze shift.

Figure 3B:
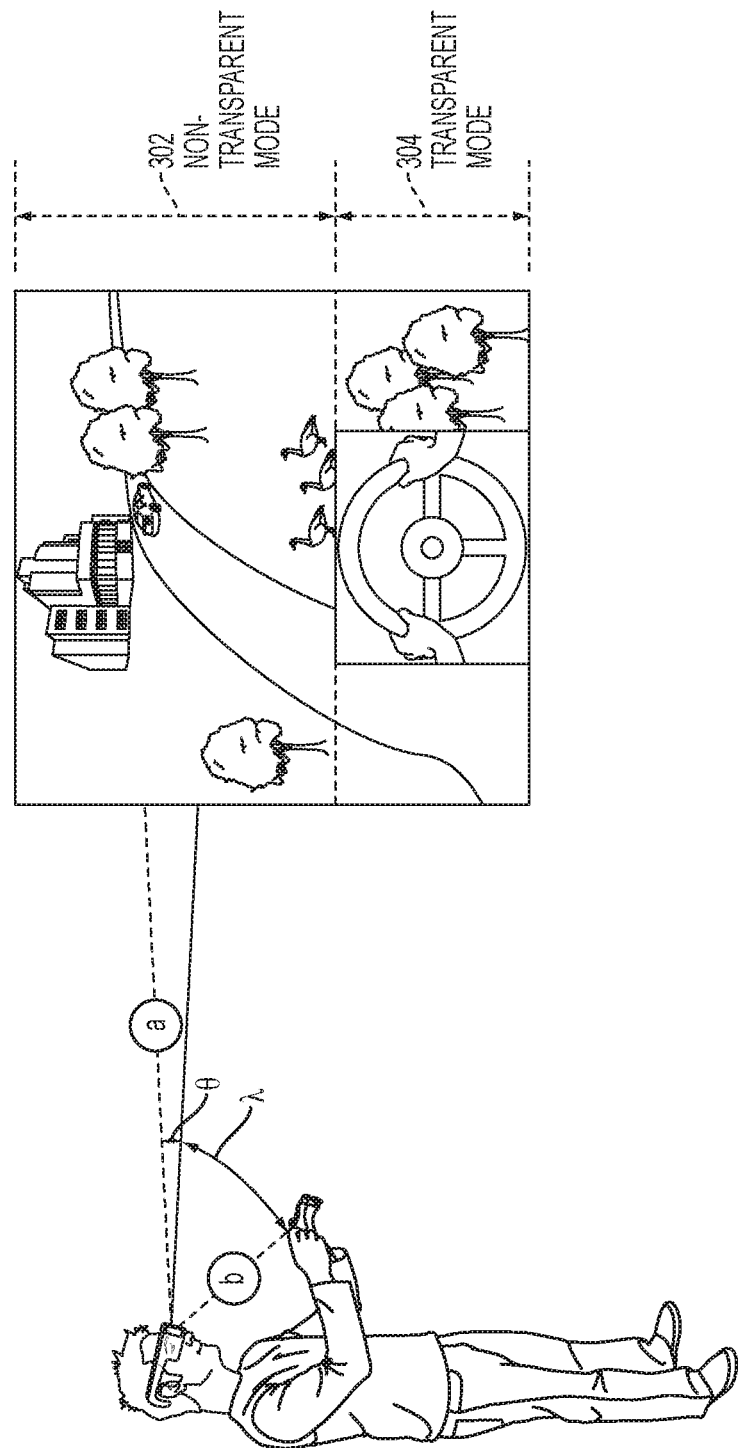

FIG. 3B illustrates the change in gaze condition, (i.e., shifting of gaze) of the user detected by the internal cameras and the direction of the shift. The internal cameras may identify the direction of the gaze shift and the level of gaze shift precisely by capturing multiple image frames of corresponding scene and feed the information to the game processing module of the HMD. In some embodiments, the images provided by the internal camera(s) may also include time-stamps for each frame captured by the cameras to enable the game processing module to analyze the image frames as a function of time to determine the shifting of the gaze of the user. The game processing module computes the angle of the shift by analyzing the gaze point from the captured frames. For example, the first gaze of the user, as illustrated in FIG. 3A, detected by the internal camera is defined by line 'a'. As defined earlier, the game processing module determines that the first gaze is at an angle 'θ' from the normal line (for e.g., x-axis). The game processing module tracks a shift in the gaze direction and determines the angle of the second gaze, represented by line 'b' in FIG. 3B, to be at an angle 'λ' from the normal line and that the gaze has shifted from an upward direction to a downward direction. Consequently, the total angle of shift in the gaze of the user is (θ+λ). Alternately, the shift in the gaze may continue to be in the upward direction. In such a case, the total angle of shift in the gaze of the user may be computed to be (λ−θ) when the angle 'λ' is greater than the angle 'θ' or (θ−λ) when the angle 'θ' is greater than the angle 'λ'. This information is used by the game processing module within the HMD to not only determine the shifting of gaze but also to identify game scene and/or objects of real-world environment in the line of sight at that angle. Precise computation of the angle of shift may be done using a triangulation technique by analyzing image frames from multiple cameras.

In response to detecting a shift in the user's gaze, the inside-mounted camera(s) may also track the gaze pattern. In some embodiments, the gaze pattern may be established by the user tracking an object or letter rendered on the screen. In some embodiments, the gaze pattern may be a back-and-forth movement of the eyes between a first position and a second position on the screen. The gaze pattern may be determined by analyzing the line of sight information and the time-stamp information provided by the image frames capturing the gaze shift. In some embodiments, the shifting in gaze is significant if the user's eyes have remained shifted from the original angle for more than a pre-defined threshold period (for e.g., 0.5 sec, 1, sec, 2 secs, 3 secs, 4 secs, etc.). In one embodiment, based on the analysis of the images and the time-stamps, the game processing module may determine that the game pattern has not identified any significant change in the gaze condition of the user, i.e., shifting of gaze was insignificant (time-wise or angle-wise), temporary (occurred once for less than the predefined threshold period) and the user has continued to focus on the portion or region of the screen that is exhibiting game-related activity. In this embodiment, the game processing module of the HMD will continue to maintain the non-transparent mode for the screen and continue to render the interactive scenes for the game streamed from the game program.

In some embodiments, based on the analysis of the gaze condition, if the game processing module establishes a user's gaze shifting to a different portion of the screen, the game processing module tries to determine if the direction of user's shifted gaze correlates to a different area of the game. If so, the game processing module may switch the interactive scenes to interactive scenes that correlate with the new portion of the screen for rendering at the HMD.

In one embodiment illustrated in FIG. 3B, if the gaze pattern establishes that the user's gaze is switching between a first region 302 and a second region 304, then the game processing module will determine the direction of interest for the user, determine an object from real-world environment that is aligned with the line of sight and provide a visual of the object in a corresponding region or portion of the screen every time the user's gaze is directed to that portion of the screen. For example, a user may be involved in a car racing game. As he is playing the game, scenes from the car racing game correlating with the user's input from the HHC and HMD are rendered on the screen of the HMD. During the game play, the user's gaze may have shifted from looking straight ahead at the car racing game scene to looking downward toward the bottom of the screen. In this case, the game processing module will identify the shift in gaze, establish a gaze pattern to see if the shift in gaze is significant (in relation to angle and/or time), and use this information to identify either the real-world object/scene or virtual-world object/scene aligned in that line of sight.

In one embodiment illustrated in FIG. 3B, it might be determined that the object in the line of sight of the shifted gaze may be the HHC in the user's hand that is providing the input to the HMD. The object in the line of sight of the shifted gaze may be determined by correlating the input data from the internal camera with the data from observation camera and the external cameras mounted on the HMD to determine the object of interest that correlates with the angle of the shifted gaze. This information is used by the game processing module to direct the external camera of the HMD to capture an image of the HHC in the user's hand(s). In response to the command from the game processing module, the external camera of the HMD captures the image of the identified object and transmits the same to the game processing module, which then converts the visual image to digital data and forwards the digital data for rendering at a corresponding portion of the screen of the HMD. In some embodiments, the visual image of the object may be adjusted to correlate with the interactive scenes of the game. For example, if the object in the line of view is a controller and the game is an interactive car racing game, the visual image of a controller (i.e., real-world object in the line of the shifted gaze of the user) may be adjusted to appear as a car steering wheel.

In one embodiment represented in FIG. 3B, the image (i.e., a visual or adjusted visual) of the HHC held in the user's hand is rendered in the bottom portion of the screen of the HMD, represented by region 304, while the remaining portion of the screen, represented by region 302, continue to render the interactive scenes from the game streaming from the computer or the game cloud. As a result, the bottom portion of the HMD screen is considered to have transitioned from a non-transparent mode to a simulated transparent mode while the remaining portions of the screen continue to render in a non-transparent mode. In some embodiments, the image of the rendered scene/object from the real-world includes visual depth to provide a 3-dimensional immersion effect on the screen.

In the embodiment illustrated in FIG. 3B, for example, the image of the object is super-imposed over the scene rendered in a part of the bottom portion 304 while allowing the interactive scenes to be visible in the remaining part of the bottom portion. The image of the object is rendered in the foreground in the part. In this example, only a part of the bottom portion is considered to have transitioned to simulated transparent mode while the remaining part of the bottom portion and the rest of the screen continues to render the interactive game scene. In another embodiment, the interactive game scene may be presented in the remaining part of the bottom portion in greyed-out format, suggesting that the bottom portion is in a simulated transparent mode. In yet another embodiment, the entire bottom portion may be transitioned to simulated transparent mode and the image of the object of interest (i.e., HHC from the above example) along with the surrounding real-world objects captured by the forward facing camera, may be rendered. Alternately, the object may be rendered in the background while the interactive scenes are rendered in the foreground.

It should be noted that the user's gaze may shift in any direction. As a result, corresponding portions of the screen of the HMD may transition from non-transparent to transparent mode depending on what is being rendered on that portion of the screen.

In one embodiment, not all shifts in gaze will result in the transition from a non-transparent mode to transparent mode. For example, the user's gaze may shift from right side of the screen to the left side of the screen. In this embodiment, the user's gaze may have shifted in response to a change in the game based on input from the user provided through the HMD or HHC, input from another user (in case of multiplayer game), or input from the game. In this embodiment, the left side of the screen may include interactive game scenes based on the changes in the game. In one embodiment, when the shift in the user's gaze is detected, the game processing module may determine if the shifting of the user's gaze exceeds a pre-defined threshold limit, such as 3 seconds, for example. When the gaze shift exceeds the threshold limit, the game processing module updates the screen of the HMD to render game scenes corresponding to the scenes from the direction of the user's gaze while continuing to maintain the non-transparency mode of the screen.

As mentioned earlier, the trigger event to transition a portion of the screen from non-transparent mode to semi-transparent or fully-transparent mode is not restricted to the detection of shifting of gaze. In one embodiment, the transition event may be triggered in response to a movement detected in the real-world, near the user or in the line-of-sight of the user's camera(s) and/or observation camera. For example, the transition may be triggered when a person enters a room in which the user is engaged in game play of a game executing on a computer or on the game cloud.

FIG. 3C illustrates one such scenario when user 333 enters the room in which user 108 is playing an online game. The screen of the HMD worn by user 108 during game play is rendering interactive scenes from the game play of the game program. When the game processing module detects user 333 entering the room, the game processing module alters the scene rendered on the screen of user's HMD to include the image of the user 333 entering the room, as shown in the portion 340b of the HMD screen, while continuing to render the interactive scenes of the game play in the remaining portion represented by 340a. In this embodiment, the portion of the screen 340b that is altered correlates with the direction of user 333's entrance into the room or appearance in the line-of-sight of the cameras detecting the movement. In some embodiments, the change in the scene provides a three-dimensional view of a portion of the room where the user 333 entered. In this embodiment, the HMD screen is considered to have transitioned to a semi-transparent mode as the portion 340b continues to render the interactive scenes along with the user 333.

Figure 3D:
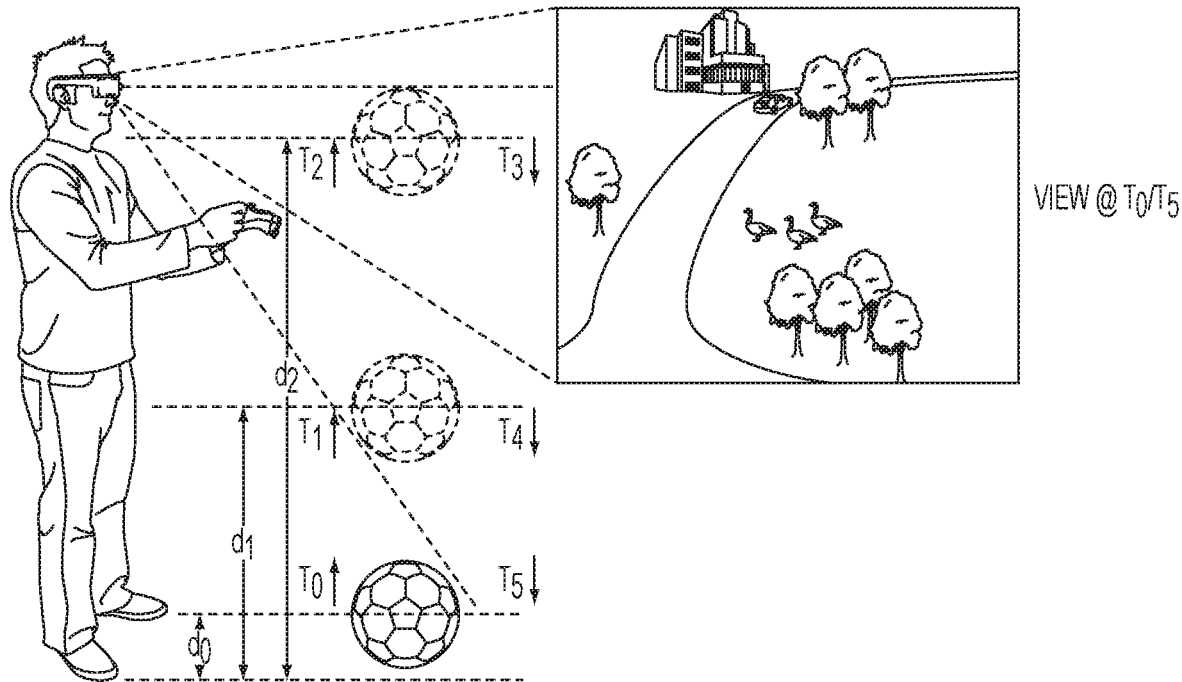
Figure 3E:
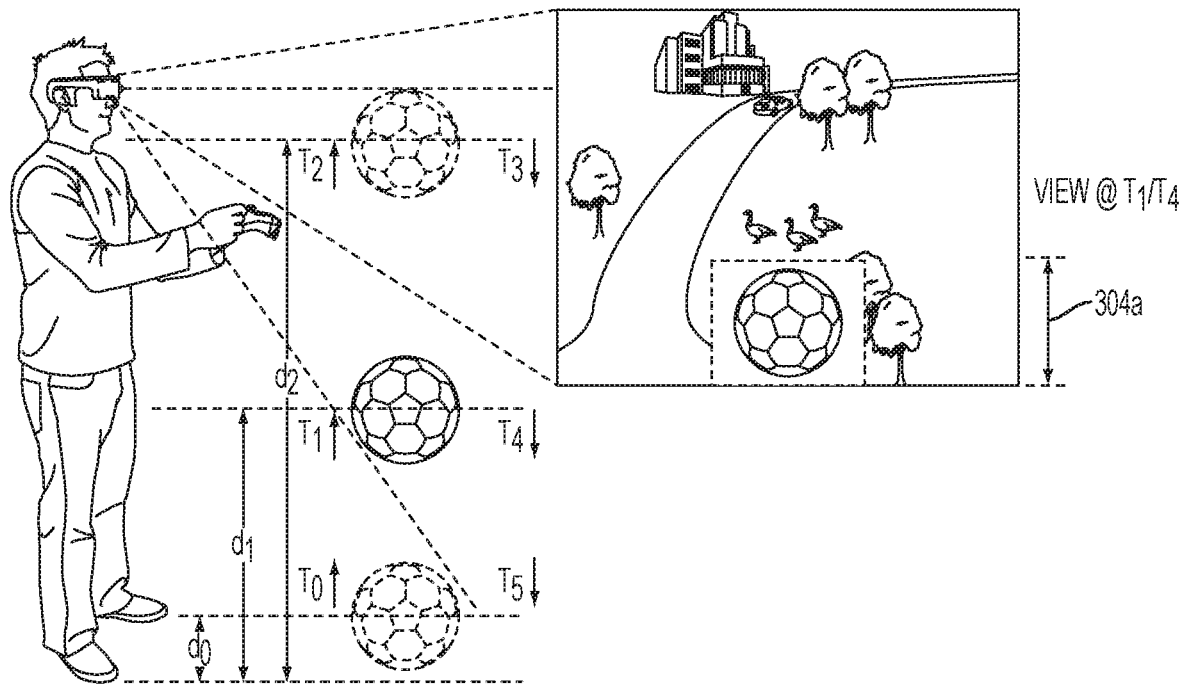
Figure 3F:
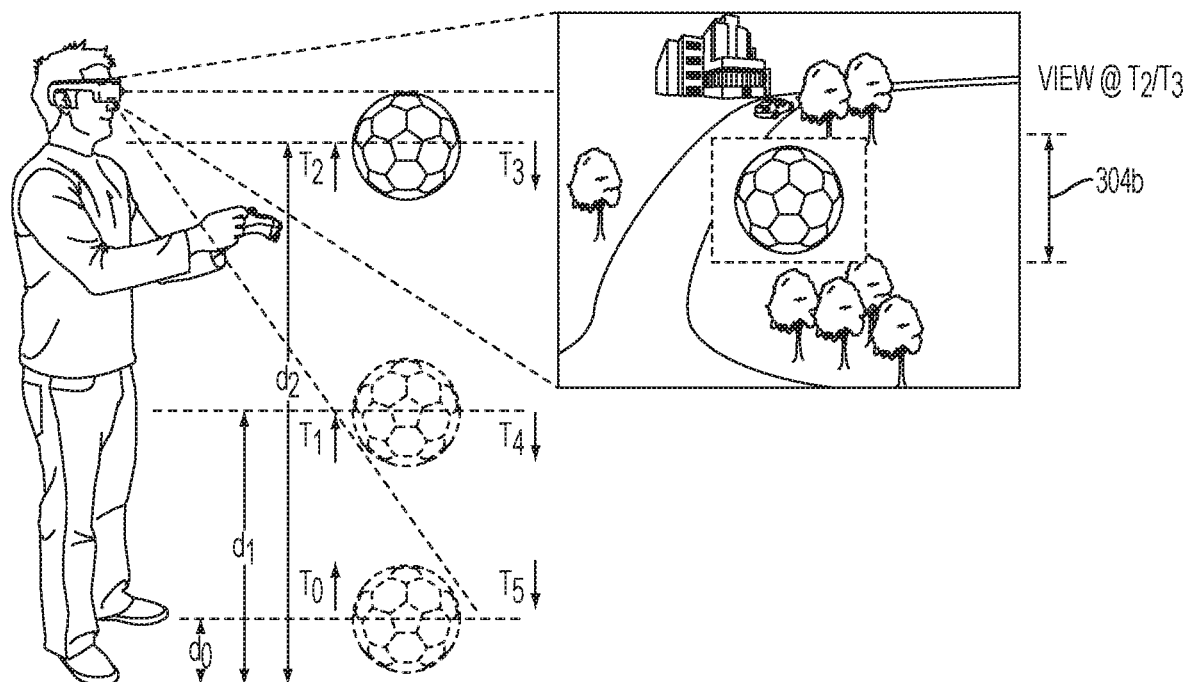

Alternately, the transition may be triggered when an object comes in a line-of-sight of the outside-mounted camera of the HMD or the external camera(s). FIGS. 3D-3F illustrate one such embodiment. In FIG. 3D, the screen of the user's HMD is rendering an interactive scene of the game the user is playing, at time $T_0$. At time $T_0$, an object, (e.g., a bouncing ball) has started bouncing up but is outside of the view of the cameras associated with the user's HMD. In this example, the object (i.e., ball) is at a height do from the surface. At time $T_1$, the ball bounces to a height $d_1$ and, as a result, comes in the view of at least one camera associated with the HMD (either the external camera or observation camera). In response to the detection of the object by at least one of the cameras, the game processing module may render a 3-dimensional image of the ball in the portion of the screen that correlates with the angle/position of the ball's location (distance d1) in the screen as detected by the at least one camera.

Consequently, as illustrated in FIG. 3E, the ball bouncing at height $d_1$ is rendered in the portion or region 304a of the screen while the remaining portion of the screen continues to render the game-related interactive scene. Similarly, at time $T_2$, the at least one camera of the HMD detects the ball at a different angle/location as the ball continues its upward ascent to a distance of $d_2$ and the game processing module translates the different angle/location of the ball to the corresponding location on the screen where to render the image of the ball. FIG. 3F illustrates the location 304b where the image of the ball is rendered (the location 304b may correlate with the height $d_2$) while the remaining portions of the screen continue to render the interactive scene from the game. When the ball falls down, the movement of the ball in the downward direction is captured till the ball moves out of the capturing range of the cameras. Thus, FIG. 3D illustrates the scene rendered on the screen of the HMD at time $T_0$ as well as at time $T_5$, FIG. 3E illustrates the scene with the ball covering a portion 304a of the screen at time $T_1$ (corresponding to ball ascending) as well as at time $T_4$ (corresponding to ball descending) and FIG. 3F illustrates the scene with the ball covering a portion 304b of the scene at time $T_2$ (corresponding to ball ascending) as well as at time $T_3$ (corresponding to ball ascending). In this embodiment, the HMD screen is considered to have transitioned from a non-transparent mode to a simulated transparent mode. In some embodiments, the image of the ball may be rendered in the foreground while the interactive scenes may be rendered in the background. Alternately, the image of the ball may be rendered in the background while the interactive scenes may be rendered in the foreground. In these embodiments, the HMD screen is considered to have transitioned from a non-transparent mode to a semi-transparent mode. The game processing module, thus, provides a user with a way to completely immerse in a game while providing a peek into scenes from the real-world based on triggering of external events or based on input from the user, such as gaze shifting, or other such visual cues explicitly or implicitly provided by the user.

Figure 3G:
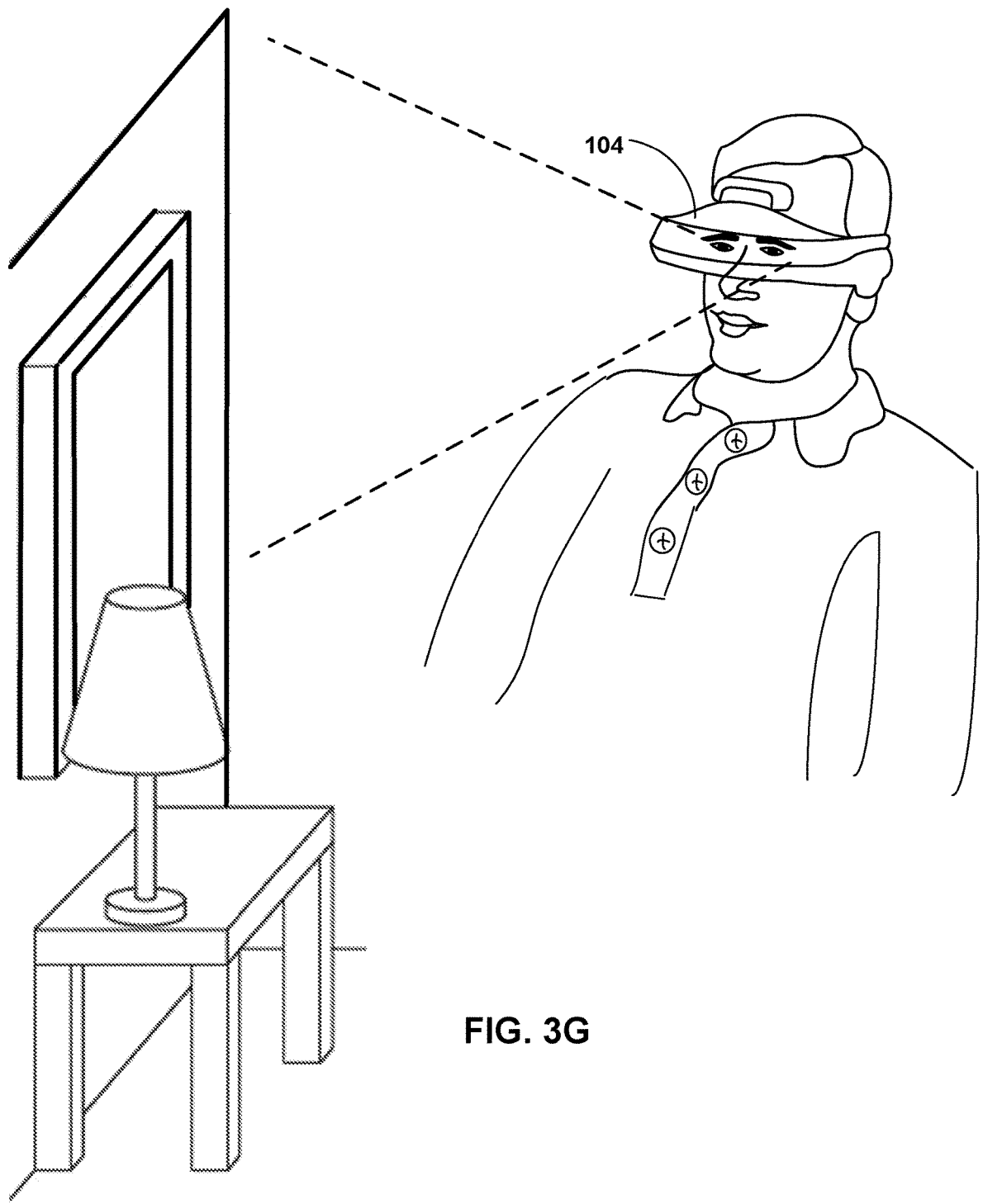

In an alternate embodiment, the HMD screen may transition from a non-transparent mode to a fully transparent mode. In this embodiment, in response to the trigger event, the game processing module may adjust optic characteristics of the HMD screen from a dark/opaque setting (representing a non-transparent mode) to a clear setting (representing a fully transparent mode). In the clear setting, the user is provided with a full view of the surrounding real-world environment in the immediate vicinity of the user, as though the user is looking through a clear glass. FIG. 3G illustrates an example of this embodiment, wherein the user is able to view the real-world objects, such as lamp, table, mirror/screen in the room where the user is using the HMD.

Figure 4A:
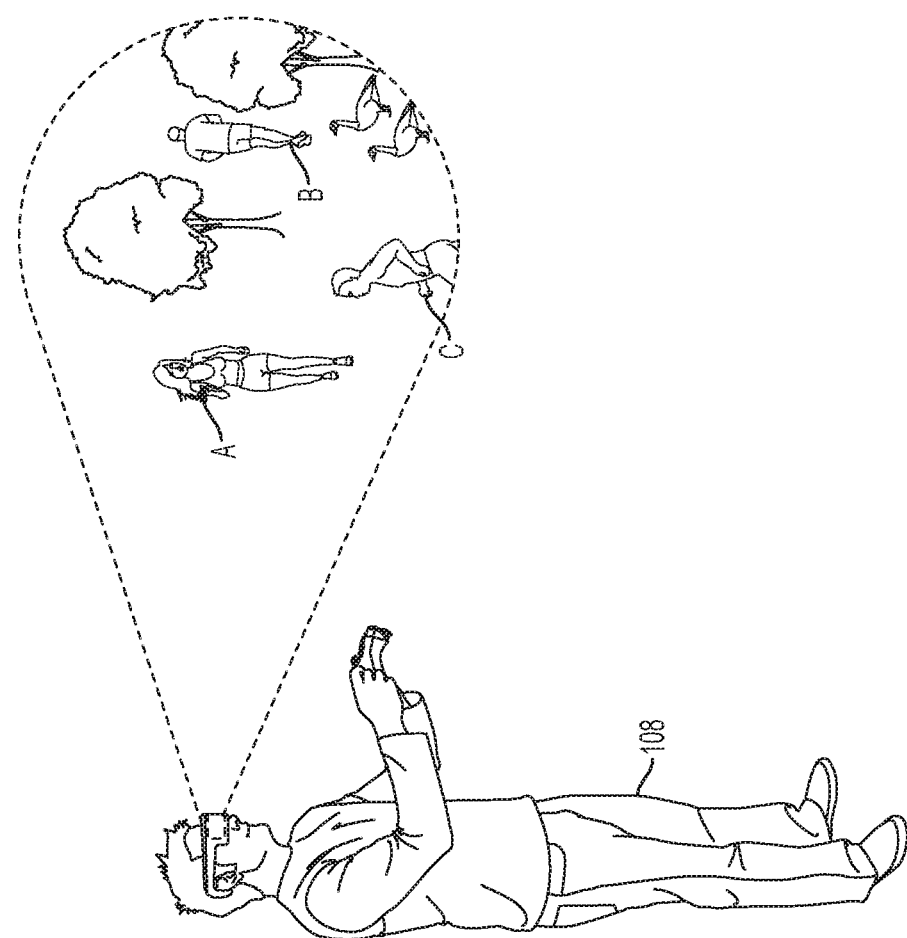
FIGS. 4A-4E illustrate implementation of transitioning between a non-transparent mode to a transparent mode in three-dimensional space and the different transition regions within the head mounted display, in some embodiments of the invention.
Figure 4B:
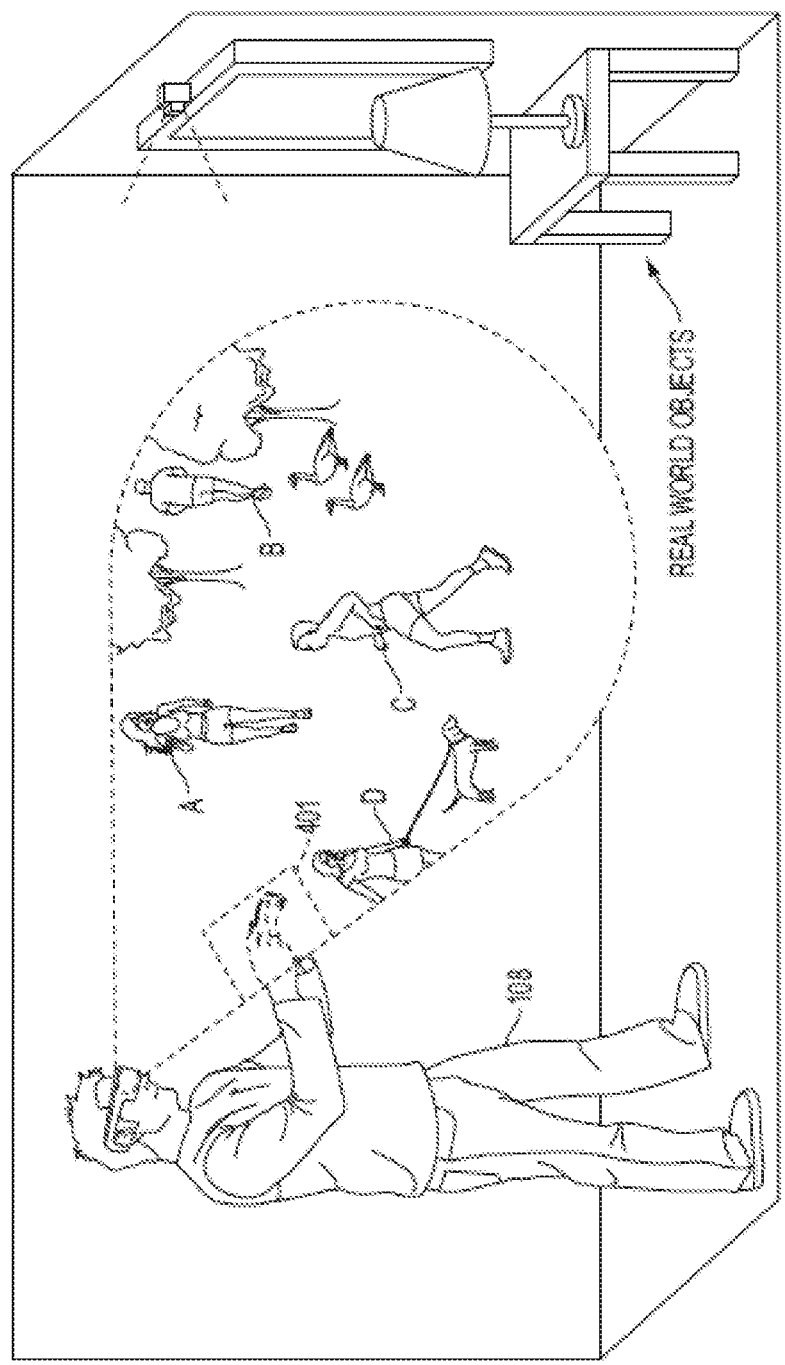

FIGS. 4A-4D illustrate alternate embodiments where the game processing module combines the interactive game scenes with three-dimensional scene from the real-world to provide a three-dimensional (3D) immersion in the game while receiving a peek into the real-world. FIG. 4A illustrates a three-dimensional game space of a game that is rendered on the user's 108 HMD screen. The game space illustrates the users A, B and C at certain distance from the user 108 and from each other. The HMD screen illustrated in FIG. 4A is shown to be in a non-transparent mode. FIG. 4B illustrates the game space as the user 108 wearing the HMD walks forward and as he looks down. The forward movement of the user 108 is reflected, in the three-dimensional game space, by the relative position, angle and location of the users A, B and C in relation to the user 108 as well as in relation to each other. Additionally, in response to the user moving his head downward, the game space has moved downward to reveal an additional player D as well as an update to the relative location of the users A, B and C in the game space. The downward movement of the user 108's head also results in the rendition of the user's HHC in a corresponding portion 401 of the 3D game space that relates to the location of the user's hand in the real-world. The HMD screen illustrated in FIG. 4B is considered to have transitioned to a semi-transparent mode and the trigger event causing such transition may be the user's movement forward and shift in gaze downward.

Figure 4C:
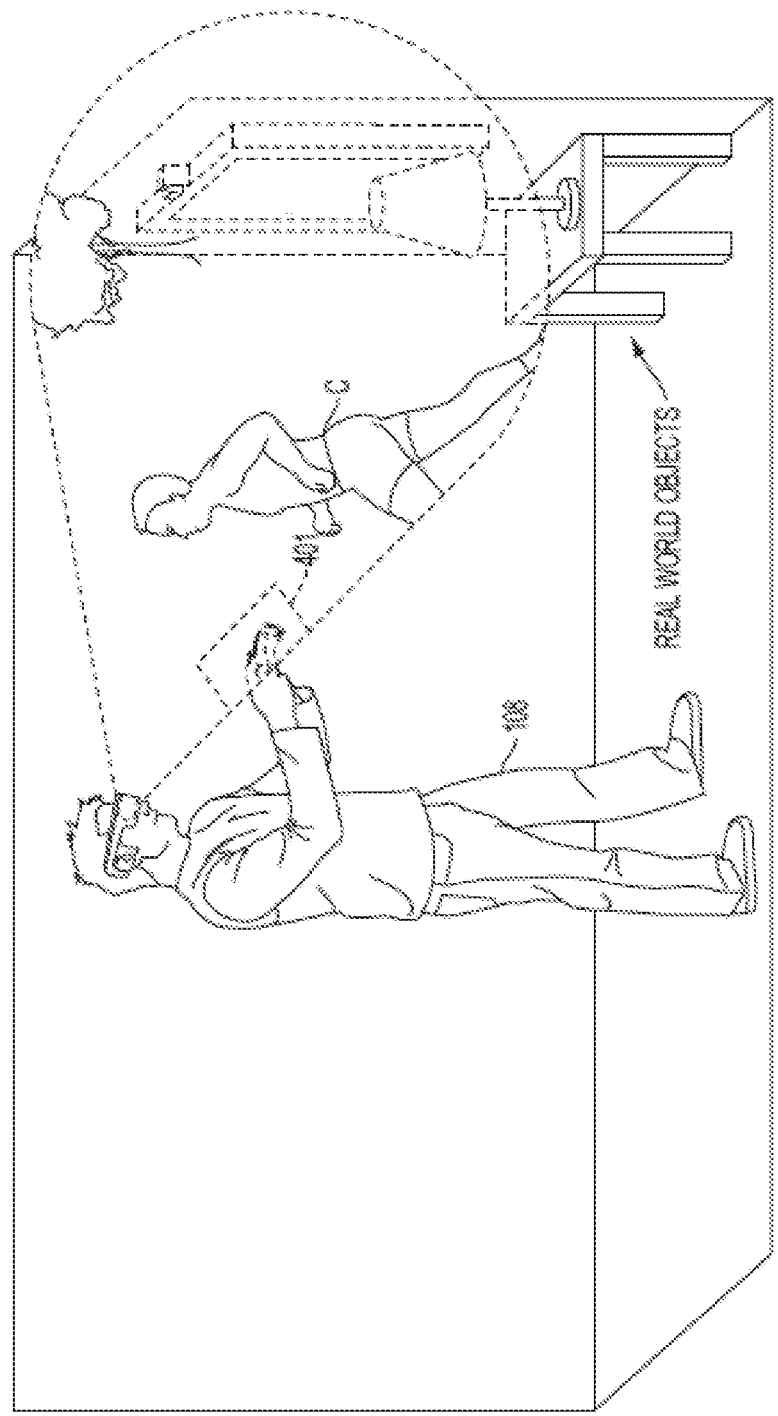

FIG. 4C illustrates the view rendered on the screen as the user 108 continues to walk forward. The game objects (i.e., users) in the interactive scene have been updated to render the objects to correlate with the user's movement. In this embodiment, the interactive scene rendered in the HMD screen shows only one user that is in the related game space (for e.g., user C) that correlates with the distance moved by the user 108. Additionally, the user's continued gaze shift downwards for a period greater than a pre-defined threshold period, will cause the game processing module to bring into focus at least some part of the real-world objects, such as table lamp, table, game console, etc., captured by the external camera. The distance, location, angle, etc., of objects in the game space and the objects from the real world are rendered on the screen of the HMD by taking into consideration the user's forward movement and downward gaze shift as captured by the observation cameras and the external cameras. Thus, the objects (both real and virtual objects) are rendered in a manner that makes the objects appear closer to the user 108. In the example illustrated in FIG. 4C, the HMD screen is considered to have transitioned from non-transparent mode to semi-transparent mode. In some embodiments, the virtual game objects are faded out to the background and the real-world objects are brought into focus (i.e., foreground). In an alternate embodiment, the real-world objects are faded out to the background and the virtual game objects are brought in focus (i.e., foreground).

In one embodiment, the transition from non-transparent mode to semi-transparent mode may be initiated at the HMD to provide a safe zone to a user for watching/interact with content rendered on the display screen of the HMD, including game scenes from gameplay. For example, a user who is fully immersed in gameplay of a video game may be moving around in a room while still engaged in the video gameplay. As a result, the user may get closer to an object, such as a wall, a lamp, a table, a chair, a sofa, a bed, a cord, a pet, a person, etc., in the room. In order to prevent the user from bumping into the object, from being tangled in a wire/cord of the HMD, from getting hurt, or from causing damage to the object, the game processing module in the HMD detects the user's proximity to the object. In response to the user's movement and actions the system may initiate a transition of the display screen of the HMD from non-transparent to semi-transparent mode, e.g., when the user is coming close to an object. In the semi-transparent mode, the game processing module blends or brings in the object from the real-world into the game scene that is being rendered on the display screen of the HMD, to indicate to the user the presence and proximity of the object in the direction of the user's movement. In one example, the size and proximity of the object that is rendered in the display screen may be proportional to the relative proximity of the real-world object to the user. In one embodiment, the real-world object may be rendered in an outline form represented by dotted lines, as illustrated in FIG. 4C. The outline form may be a gray-out form, a broken line form, an outline form, a ghost form, a semi-transparent form or a fully viewable presentation. In one embodiment, in addition to the transition, the game processing module may issue a warning sign to the HMD user when the user moves too close to an object in the room. The warning sign may be in audio format, haptic format, visual format, or any combinations thereof. The game processing module, thus, may be used for safety purposes wherein the system allows a user to have enriching viewing experience while preserving the safety of the user and of the objects in the immediate surrounding environment of the user. In one embodiment, the camera that is used to capture the real-world object may be a depth sensing camera, a regular RGB camera (providing the three basic color components—red, blue, green, on three different wires), or an ultrasonic sensor that can identify proximity, depth and distance of an object from a user, or any combinations thereof.

Figure 4D:
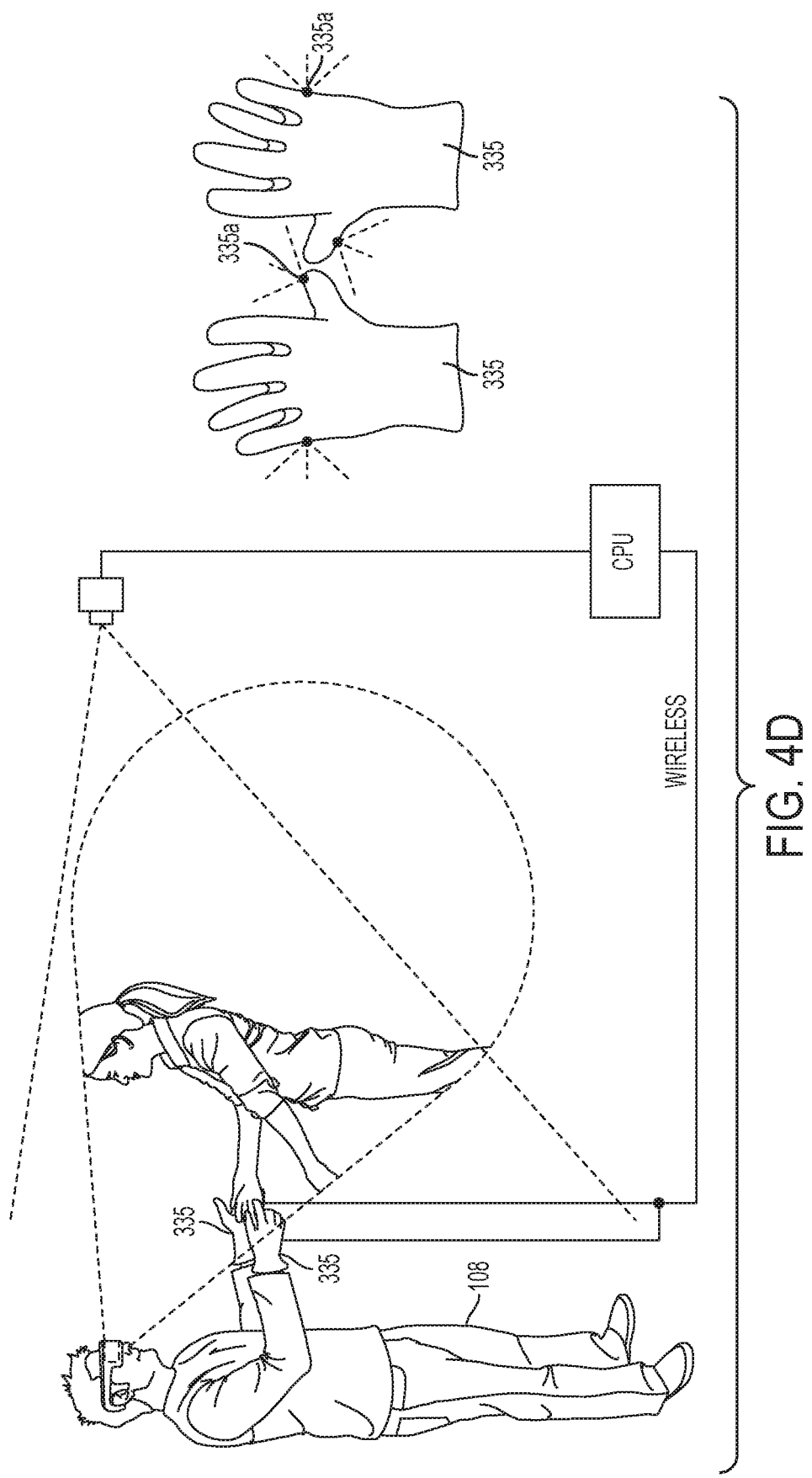

FIG. 4D illustrates the game space rendered on the screen of the HMD of the user 108 as the user 108 immerses in a 3D interactive experience with the game objects in the game space in the game. In one embodiment, the user interacts with the game objects using controller gloves 335. The controller gloves 335, in one embodiment, are configured to provide tactile feedback to a user during game interactions with game objects to provide a more realistic game experience. In some embodiments, the controller gloves include marker elements 335-a, such as LED lights, or other trackable objects/markings, etc., to enable the cameras (external and observation) to detect the finger/hand motions during interactive game play. The controller gloves acts as the HHC, in that they communicate with the computer and the HMD using wireless communication protocol. The communication may also include receiving instruction data that provides feedback to the gloves. Controller glove is one example of interactive object that can be used by a user. Other interactive objects that can be used by a user to immerse in 3D interactive experience include clothes, shoes, or other wearable articles of clothing, wearable devices, or holdable objects. FIG. 4D illustrates the user 108 interacting with user B in the game space using the controller gloves 335. The game processing module detects the presence of the controller gloves within the game space and transitions the HMD screen from non-transparent mode to semi-transparent mode so as to provide an image of the user's hand within the controller gloves (real-world object) in the location that correlates with the location of the user B's hand. This transition of the relevant portion of the screen makes it appear that the user 108 is actually interacting with user B in the 3D space.

Figure 4E:
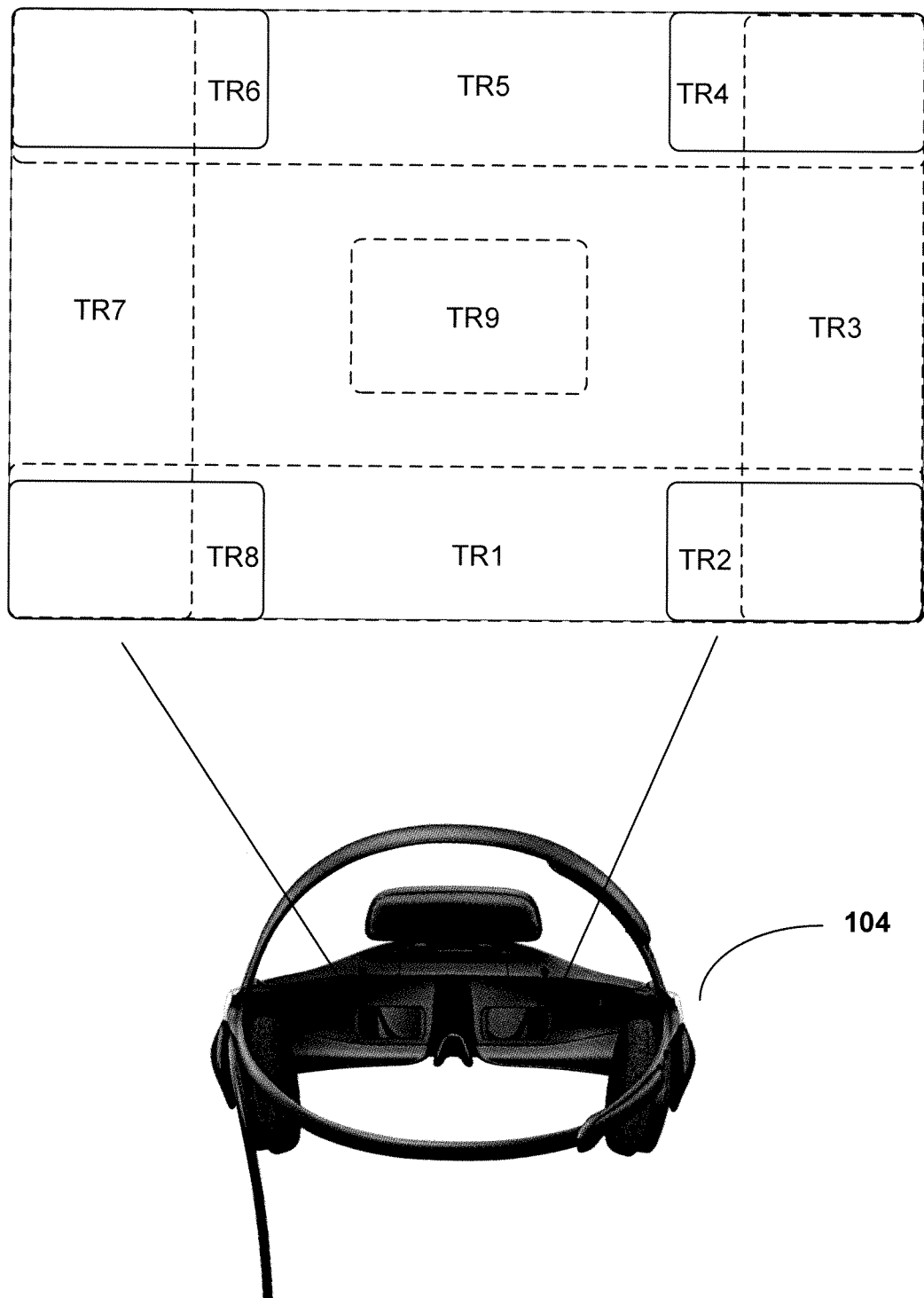

In another embodiment, the transition may be triggered in response to a sound detected near the user 108 or near the microphone that is integrated or coupled to the HMD of the user 108. Additionally, the transition may be triggered by explicit commands, such as voice or other auditory commands originating from the user, from other users near the user, from other objects near the user, from applications executing on the HMD (such as pings, text, email, phone, message, etc.). In response to the trigger event, the game processing module of the HMD determines the direction from which the trigger event occurred using audio sensing technology, identify the object or scene that is aligned in that line of sight and provide a visual of the object or the scene in the corresponding portion of the screen of the HMD. The screen is transitioned from non-transparent mode to semi-transparent by rendering objects with the interactive game scenes or simulated transparent mode by replacing interactive game scenes with the image from the real-world environment from the vicinity of the user. The trigger event provides a peek view to the real-world scenario while allowing the user to continue to immerse in the game. The direction of the event that triggers the transition may be accurately determined using triangulation technique using audio sensing technology and use the information from the audio sensing technology to identify the objects using external cameras and the observation camera(s). The observation cameras may be able to use the marker elements, such as LEDs, mounted on the outside surface of the HMD to determine the relative position and direction of the user in relation to the trigger, such as a person entering the room, a sound detected near the user/microphone of the HMD, etc. Any portion or region of the screen of the HMD, such as regions represented by TR1-TR9 in FIG. 4E, that correlate with the location/direction of the trigger may be transitioned from non-transparent mode to semi-transparent mode.

In some embodiments, the transition from non-transparent mode to transparent mode (i.e., semi-transparent, simulated transparent or fully transparent mode) may be done in gradual increments either in a linear fashion or non-linear fashion. The transitioning of a portion of the screen from non-transparent mode to semi-transparent mode may be performed using any form of fading and an audio, tactile or other form of feedback may be provided to the user when the transition occurs. The areas or regions that are transitioned from non-transparent to semi-transparent may be dynamically set depending on the scene rendered by the HMD, depending on objects held by the user, depending on the gaze direction of a user, depending on audio/motion signals detected or depending on the environment in which the user is using the HMD. The transition of certain portions of the screens in the HMD enables a user to establish a connection between the real-world and the virtual world. Thus, when there is an action in the real-world involving a real-world physical object that is related to an action occurring in the virtual world with a virtual object, the system provides a way of tying together the action in the real-world with the action in the virtual world by allowing the user to see a transparent version of the real-world from within the virtual world. Further, the system may provide a way to render action in the real-world involving a physical object that may not be tied to the virtual world to provide a real-world awareness to the user.

In one embodiment, transition from non-transparent mode to semi-transparent mode may be in response to user's interaction in game play of an interactive game. For example, a first user may be engaged in a multi-player game with a second player. In this embodiment, when the first player points to an object or region, the game processing module is able to detect the direction the first user is pointing, determine the object or scene in the direction of the pointing, and provide an appropriate view of the object or scene to the second player in a semi-transparent mode. In this embodiment, the object or scene may be an object/scene in the real-world object/scene. The game processing module, in this embodiment, receives input from the external cameras mounted on the HMDs of the first and the second players as well as one or more observation cameras to track multiple points in space in the direction of the pointing so as to be able to determine the angle between the two players' views to the object and then capture the appropriate 3D image for rendering at the HMD of the second player, using the triangulation technique. In one embodiment, the view of the object or scene that is presented to the second player correlates with the second player's position and view of the object/scene in the real-world as seen/viewed by the second player.

In some embodiments, the system may detect the user's engagement in a certain portion of the screen and not much engagement in a main portion of the screen, where the actions occurring in the game are currently being rendered. The portion of the screen to which the user's attention is directed may not have any significant game actions occurring at this time. In these embodiments, the system may determine that the user's interest and focus has shifted from the game and may pause the video game rendition on the HMD screen. Additionally, the system may send a pause signal to the game cloud to pause the execution of the game program. In this embodiment, the game processing module may transition the entire screen from a non-transparent mode to a fully-transparent mode by adjusting the optic characteristics of the screen to a clear setting so as to allow the user to view the real-world objects within the environment vicinity of the player. In an alternate embodiment, the game processing module may transition the entire screen from a non-transparent mode to a simulated transparent mode by capturing images of the real-world and replacing the interactive scenes of the game with the captured images of the real-world. The transition from the non-transparent mode to fully transparent or simulated transparent mode may be done gradually depending on the intensity of the game play that was rendering on the screen of the HMD of the user to allow the user to transition from the virtual environment to the real-world environment.

In one embodiment, the system may detect the shifting of the user's interest/focus and provide an option to the user for pausing the game. The option for pausing the game may be provided in the form of activation of a button, a voice command, an eye signal, an audio command, etc. In addition to providing a pause option, a resume option may also be provided to the user to enable the user to access and immerse in the game from where the user left off when the user selected the pause option. The resume option may be provided in forms that are similar to or different than the pause option.

In some embodiments, after transitioning from non-transparent mode to transparent mode (for e.g., semi-transparent, fully transparent or simulated transparent mode), the game processing module may return the portion of the screen to non-transparent mode after expiration of a pre-set period of time. In some embodiments, transitioning from non-transparent to transparent and back to non-transparent mode may be made in response to the user actions. For example, when a user gazes back and forth between the main game area and a specific portion of the screen (such as bottom, left, right, top, etc.), the game processing module detects this back and forth movement of the user's gaze to establish the gaze pattern. Based on the gaze pattern, the game processing module switches the appropriate portion of the screen between a non-transparent mode and a semi-transparent (where the real-world scene is presented along with the interactive scenes) or simulated transparent mode (where at least part of the objects from the real-world scene replaces at least a portion of the interactive scenes), in line with the established gaze pattern of the user. Thus, the bottom portion of the screen may render the HHC in the user's hand when the user's gaze is directed downward and when the user's gaze shifts upward, the interactive game scene from the game program is rendered, thereby providing a more realistic transition effect to the user. In one embodiment, the switching of certain portions of the screen from non-transparent to a semi-transparent or simulated transparent mode may be performed after confirming that the detected shift in the gaze of the user exceeds a pre-defined threshold value (i.e., the user's gaze has shifted for at least 3 seconds or 5 seconds).

Alternately, the transition from semi-transparent to non-transparent mode may occur when the event that triggered the transition either returns to a normal or steady state, is no longer available or after expiration of a period of time. For example, in the case where the transition occurred due to a person walking into a room, the transition back to non-transparent mode may occur when the person leaves the room or remains on the scene for at least the pre-set period of time defined in the pre-defined threshold value.

In one embodiment, transitioning from a non-transparent mode to a fully transparent mode may occur when a user who is fully immersed in a high intensity game wants to get to a steady state by opting out of the game. In this case, the transitioning from non-transparent mode to fully transparent mode may be made in a linear gradual increment to climatize the user to the change in intensity. During the transitioning, the game processing module may adjust the optic characteristics of the HMD screen to gradually move from the opaque/dark setting to clear setting. Alternately, the game processing module may perform transition from non-transparent mode to simulated transparent mode by receiving and rendering the real-world scene of the immediate environment of the user. In this embodiment, the game processing module may perform a gradual replacement of the interactive scenes with the captured images of the real-world scene, to make it appear that the screen of the HMD has turned completely transparent. The real-world scene may be captured by the cameras in response to the opting-out trigger event provided through user action.

The gradual change in the images being rendered on the optics screen during the transition from non-transparent mode to semi-transparent, simulated transparent or fully transparent mode is especially useful when the user is fully immersed in a high-intensity game and the shifting in gaze forces a transition from a high-intensity scene to a low-intensity scene or a static scene of the real-world.

Figure 5:
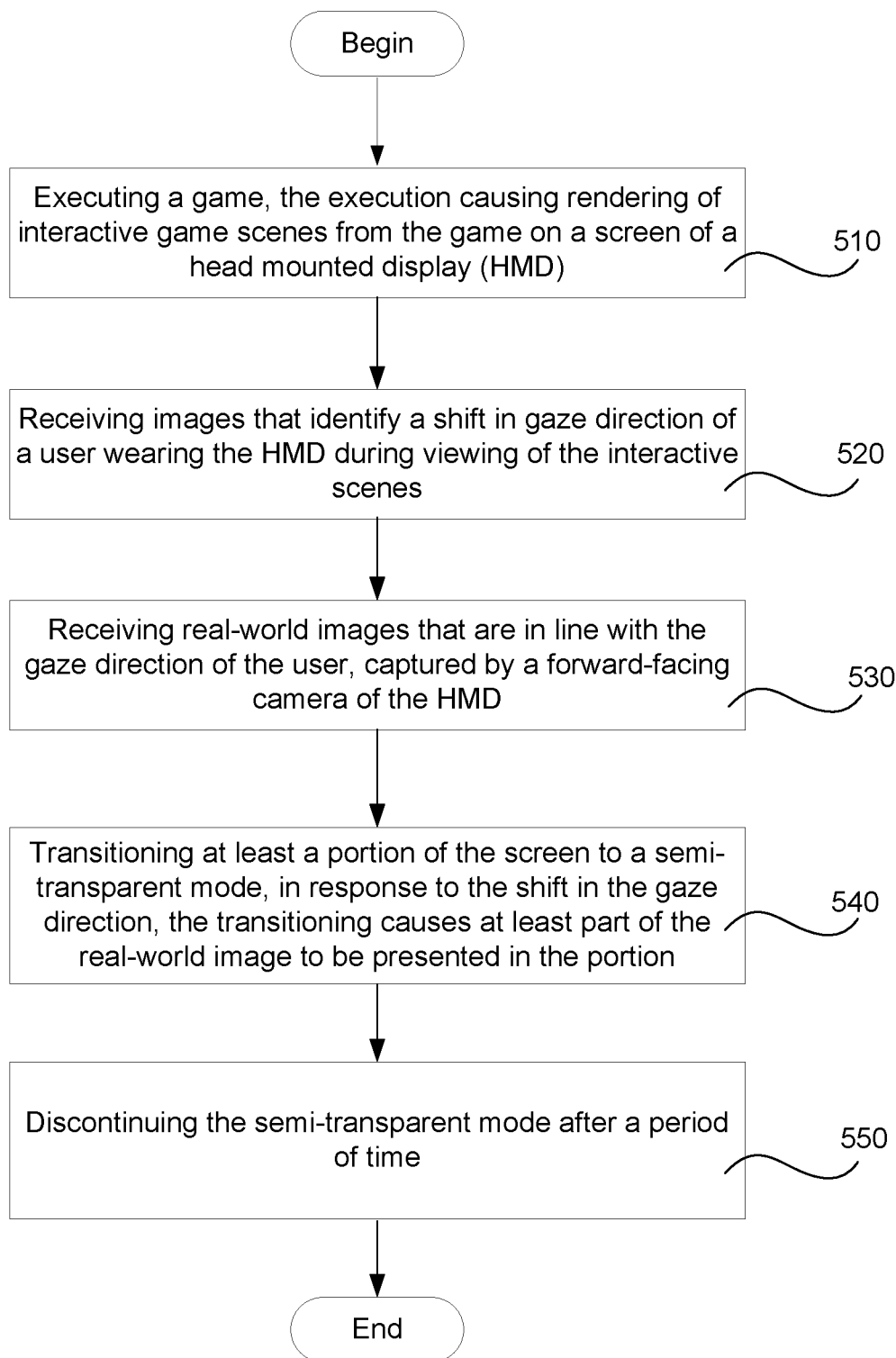
FIG. 5 illustrates a method operation for executing a game presented on a screen of a head mounted display, in accordance with an embodiment of the invention.

FIG. 5 illustrates method operations for executing a game presented on a screen of a head mounted display, in one embodiment of the invention. The method begins at operation 510, wherein a game is executed. The game may be executed on a computer or may be executed on a game cloud. Interactive scenes of the game are rendered on the screen of the HMD as the game is executed. The interactive scenes include virtual objects, virtual environments and changes to the virtual objects/environments as the game progresses. The media data for the interactive scenes are streamed from the computer or the game cloud.

As the game is progressing, a shift in gaze direction of the user wearing the HMD, is detected, as illustrated in operation 520. One or more internal cameras available within the HMD may be used to monitor the gaze direction of the user, during game play and provide images of the user's gaze direction to a game processing module of the HMD. The game processing module receives the images from the internal cameras and detects a shift in the gaze direction of the user. The game processing module may further analyze the shift in gaze direction to determine if the shift is for at least a pre-defined threshold period. When it is determined that the gaze shift is for at least the pre-defined threshold period, the game processing module will direct forward facing cameras of the HMD to capture real-world images that are in line of the gaze direction.

The game processing module receives the real-world images captured from the forward-facing camera of the HMD, as illustrated in operation 530. The real-world images are captured in response to trigger events (such as shift in gaze). Shift in gaze is one type of trigger event that causes the capturing images of real-world environment in the vicinity of the user wearing the HMD, and other trigger events may also cause the capturing of real-world environment images from the immediate vicinity of the user wearing the HMD. In some embodiments, instead of capturing the images of the real-world environment in the vicinity of the user, the game processing module may identify the game scene that is in the direction of the user's gaze shift and may provide the same at the screen of the HMD.

A portion of the screen of the HMD is transitioned to a semi-transparent mode such that the transitioning causes image of at least part of the real-world object to be presented in a portion of the screen with the interactive scenes of the game, as illustrated in operation 540. The transition may be done in gradual increments. In some embodiments, the image of the objects from the real-world environment are rendered in the portion of the HMD screen such that real-world environment objects are rendered in the foreground and the interactive scenes are rendered in the background. In other embodiments, the image of the objects from the real-world environment are rendered in the portion of the HMD screen such that real-world environment objects are rendered in the background and the interactive scenes are rendered in the foreground. The transparent mode may be discontinued after a period of time, as illustrated in operation 550. The discontinuation of the transparent mode causes the HMD screen to switch to non-transparent mode wherein the interactive scenes of the game are rendered in the HMD screen. The switching to non-transparent mode allows the user to fully immerse in the game while the transition into the transparent mode provides a peek into the real-world as the user continues to immerse in the game.

Figure 6:
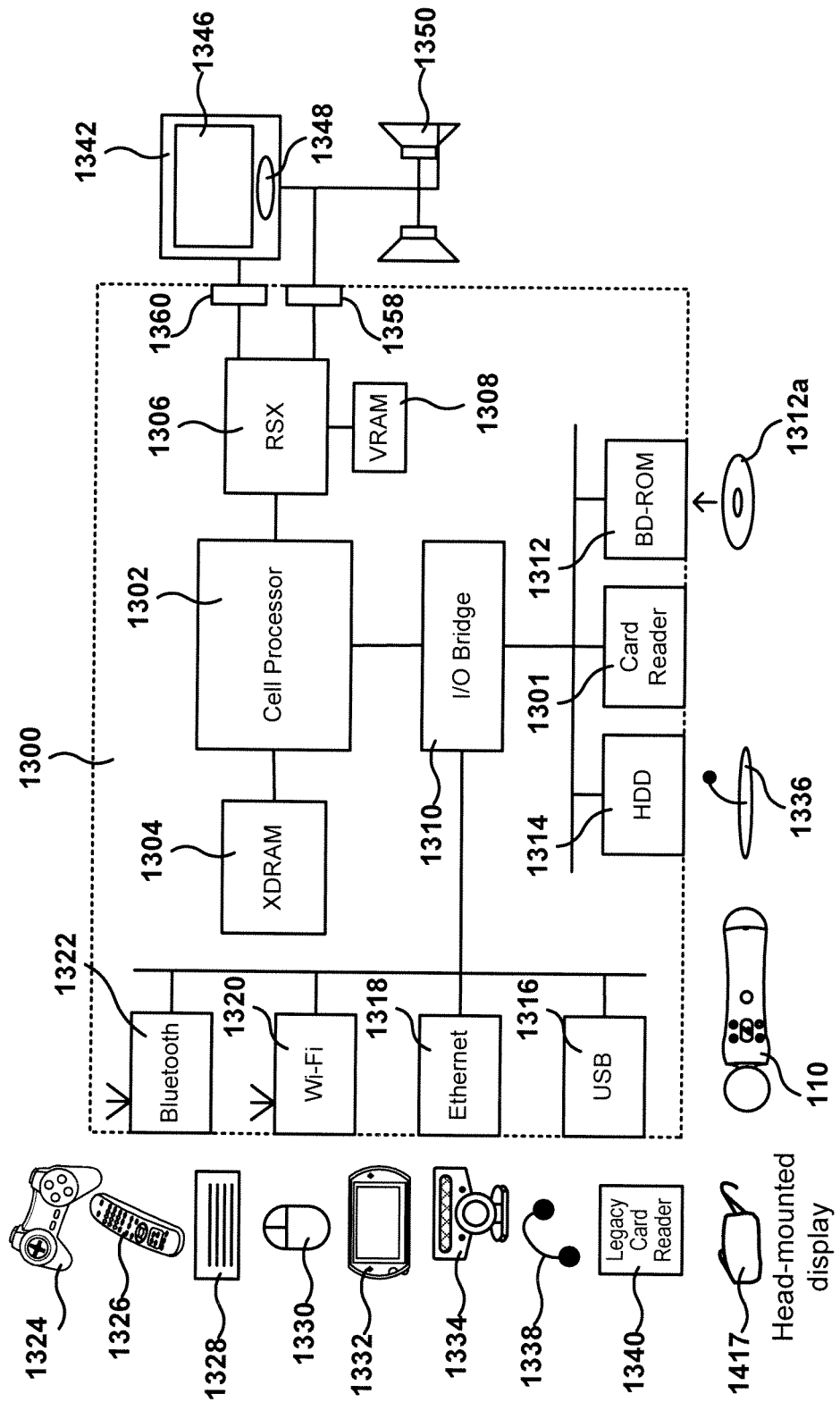
FIG. 6 illustrates overall system architecture of a game module, in one embodiment of the invention.

FIG. 6 illustrates hardware and user interfaces that may be used to implement some embodiments of the invention. FIG. 6 schematically illustrates the overall system architecture of the Sony® PlayStation 3® entertainment device. Other versions of PlayStation may include more or less features. A system unit 1300 is provided, with various peripheral devices connectable to the system unit 1300. The system unit 1300 includes: a Cell processor 1302; a Rambus® dynamic random access memory (XDRAM) unit 1304; a Reality Synthesizer graphics unit 1306 with a dedicated video random access memory (VRAM) unit 1308; and an I/O bridge 1310. The system unit 1300 also comprises a Blu Ray® Disk BD-ROM® optical disk reader 1312 for reading from a disk 1312a and a removable slot-in hard disk drive (HDD) 1314, accessible through the I/O bridge 1310. Optionally, the system unit 1300 also comprises a memory card reader 1301 for reading compact flash memory cards, Memory Stick® memory cards and the like, which is similarly accessible through the I/O bridge 1310.

The I/O bridge 1310 also connects to six Universal Serial Bus (USB) 2.0 ports 1316; a gigabit Ethernet port 1318; an IEEE 802.11b/g wireless network (Wi-Fi) port 1320; and a Bluetooth® wireless link port 1322 capable of supporting of up to seven Bluetooth connections.

In operation, the I/O bridge 1310 handles all wireless, USB and Ethernet data, including data from one or more game controllers 110 and 1324. For example, when a user is playing a game, the I/O bridge 1310 receives data from the game controller 110 and 1324 via a Bluetooth link and directs it to the Cell processor 1302, which updates the current state of the game accordingly.

The wireless, USB and Ethernet ports also provide connectivity for other peripheral devices in addition to game controllers 110 and 1324, such as: a remote control 1326; a keyboard 1328; a mouse 1330; a portable entertainment device 1332 such as a Sony PSP® entertainment device; a video camera such as a PlayStation®Eye Camera 1334; a shape object 1336; and a microphone 1338. Such peripheral devices may therefore in principle be connected to the system unit 1300 wirelessly; for example, the portable entertainment device 1332 may communicate via a Wi-Fi ad-hoc connection, while the shape object 1336 may communicate via a Bluetooth link.

The provision of these interfaces means that the PlayStation 3 device is also potentially compatible with other peripheral devices such as digital video recorders (DVRs), set-top boxes, digital cameras, portable media players, Voice over Internet Protocol (IP) telephones, mobile telephones, printers and scanners. In addition, a legacy memory card reader 1340 may be connected to the system unit via a USB port 1316, enabling the reading of memory cards of the kind used by the PlayStation® or PlayStation 2® devices.

The game controllers 110 and 1324 are operable to communicate wirelessly with the system unit 1300 via the Bluetooth link, or to be connected to a USB port, thereby also providing power by which to charge the battery of the game controllers 110 and 1324. Game controllers 110 and 1324 can also include memory, a processor, a memory card reader, permanent memory such as flash memory, light emitters such as an illuminated spherical section, light emitting diodes (LEDs), or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, a soccer ball, a football or rugby ball, an imperfect sphere, a section of a sphere, a truncated pyramid, a truncated cone, a baseball bat, a truncated cube, a polyhedron, a star, etc., or a combination of two of more of these shapes.

Game controller 1324 is a controller designed to be used with two hands, and game controller 110 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Sony PSP® portable device may be used as a controller. In the case of the Sony PSP® portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1326 is also operable to communicate wirelessly with the system unit 1300 via a Bluetooth link. The remote control 1326 comprises controls suitable for the operation of the Blu Ray™ Disk BD-ROM reader 1312 and for the navigation of disk content.

The Blu Ray™ Disk BD-ROM reader 1312 is operable to read CD-ROMs compatible with the PlayStation and PlayStation 2 devices, in addition to conventional pre-recorded and recordable CDs, and so-called Super Audio CDs. The reader 1312 is also operable to read DVD-ROMs compatible with the Playstation 2 and PlayStation 3 devices, in addition to conventional pre-recorded and recordable DVDs. The reader 1312 is further operable to read BD-ROMs compatible with the PlayStation 3 device, as well as conventional pre-recorded and recordable Blu-Ray Disks.

The system unit 1300 is operable to supply audio and video, either generated or decoded by the PlayStation 3 device via the Reality Synthesizer graphics unit (RSX) 1306, through audio and video connectors to a display and sound output device 1342 such as a monitor or television set having a display 1346 and one or more loudspeakers 1348, or stand-alone speakers 1350. In one embodiment, voice and gaze inputs are utilized to play sound toward specific audio speakers according to the POG of the user. The audio connectors 1358 may include conventional analogue and digital outputs while the video connectors 1360 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1302. The PlayStation 3 device's operating system supports Dolby® 5.1 surround sound, Dolby® Theatre Surround (DTS), and the decoding of 7.1 surround sound from Blu-Ray® disks.

In the present embodiment, the video camera 1334 comprises a single Charge Coupled Device (CCD), an LED indicator, and hardware-based real-time data compression and encoding apparatus so that compressed video data may be transmitted in an appropriate format such as an intra-image based MPEG (motion picture expert group) standard for decoding by the system unit 1300. The camera LED indicator is arranged to illuminate in response to appropriate control data from the system unit 1300, for example to signify adverse lighting conditions. Embodiments of the video camera 1334 may variously connect to the system unit 1300 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may, for example, be incorporated within a game or interpreted as game control inputs. In another embodiment, the camera is an infrared camera suitable for detecting infrared light.

In general, in order for successful data communication to occur with a peripheral device such as a video camera or remote control via one of the communication ports of the system unit 1300, an appropriate piece of software such as a device driver should be provided. Device driver technology is well-known and will not be described in detail here, except to say that the skilled man will be aware that a device driver or similar software interface may be required in the present embodiment described.

Figure 7:
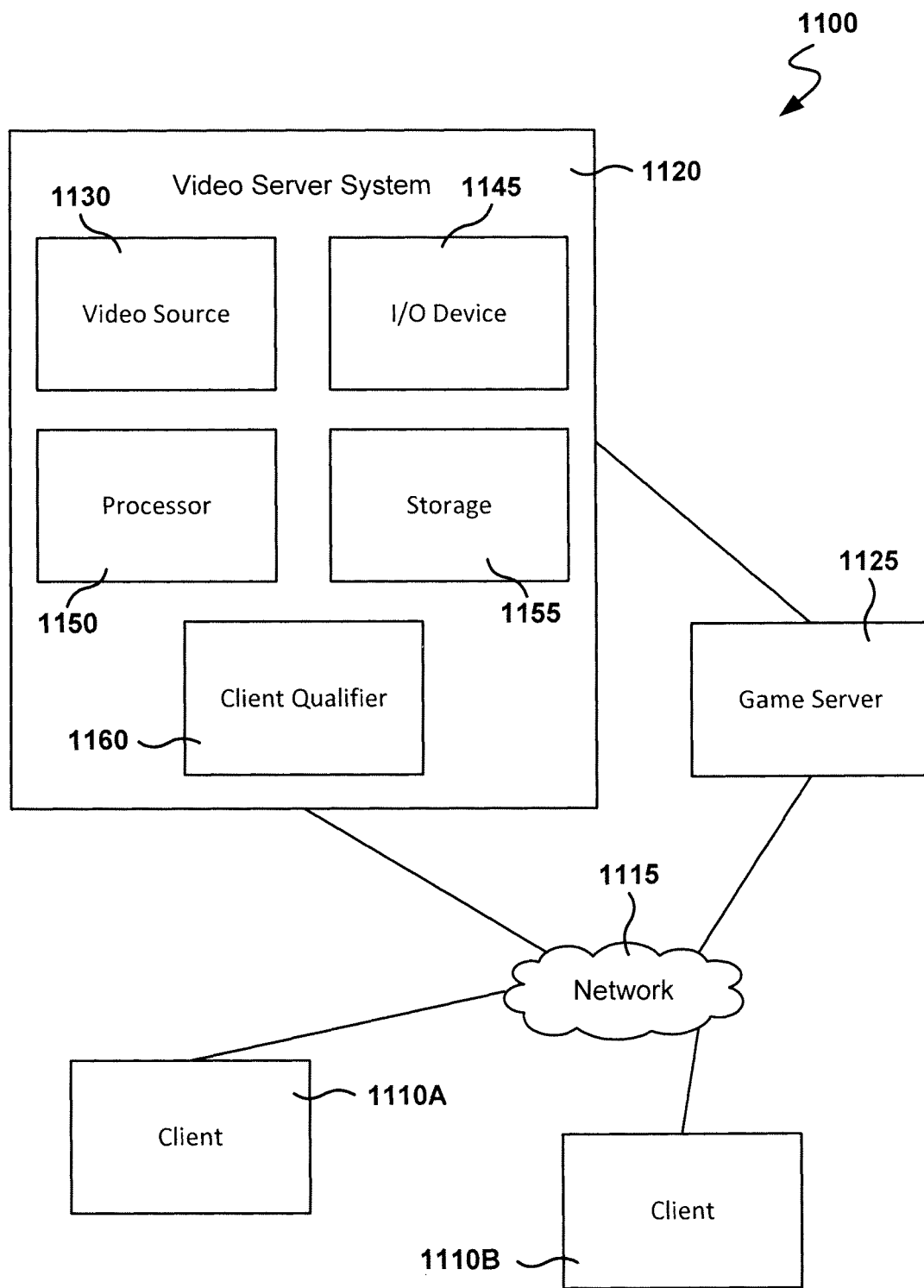
FIG. 7 illustrates a block diagram of a game system, in accordance with an embodiment of the invention.

FIG. 7 is a block diagram of a Game System 1100, according to various embodiments of the invention. Game System 1100 is configured to provide a video stream to one or more Clients 1110 via a Network 1115. Game System 1100 typically includes a Video Server System 1120 and an optional game server 1125. Video Server System 1120 is configured to provide the video stream to the one or more Clients 1110 with a minimal quality of service. For example, Video Server System 1120 may receive a game command that changes the state of or a point of view within a video game, and provide Clients 1110 with an updated video stream reflecting this change in state with minimal lag time. The Video Server System 1120 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1120 frames per second. Although higher or lower frame rates are included in alternative embodiments of the invention.

Clients 1110, referred to herein individually as 1110A., 1110B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1110 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1110 or on a separate device such as a monitor or television. Clients 1110 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1110 are optionally geographically dispersed. The number of clients included in Game System 1100 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1120 to deliver a game viewed through the HMD. In one embodiment, the game console receives the video stream from the video server system 1120, and the game console forwards the video stream, or updates to the video stream, to the HMD for rendering.

Clients 1110 are configured to receive video streams via Network 1115. Network 1115 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1110 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1110 may, but are not required to, further include systems configured for modifying received video. For example, a client may be configured to perform further rendering, to overlay one video image on another video image, to crop a video image, and/or the like. For example, Clients 1110 may be configured to receive various types of video frames, such as I-frames, P-frames and B-frames, and to process these frames into images for display to a user. In some embodiments, a member of Clients 1110 is configured to perform further rendering, shading, conversion to 3-D, or like operations on the video stream. A member of Clients 1110 is optionally configured to receive more than one audio or video stream. Input devices of Clients 1110 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1110 is generated and provided by Video Server System 1120. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1110 are typically configured to receive inputs from a user. These inputs may include game commands configured to change the state of the video game or otherwise affect game play. The game commands can be received using input devices and/or may be automatically generated by computing instructions executing on Clients 1110. The received game commands are communicated from Clients 1110 via Network 1115 to Video Server System 1120 and/or Game Server 1125. For example, in some embodiments, the game commands are communicated to Game Server 1125 via Video Server System 1120. In some embodiments, separate copies of the game commands are communicated from Clients 1110 to Game Server 1125 and Video Server System 1120. The communication of game commands is optionally dependent on the identity of the command. Game commands are optionally communicated from Client 1110A through a different route or communication channel that that used to provide audio or video streams to Client 1110A.

Game Server 1125 is optionally operated by a different entity than Video Server System 1120. For example, Game Server 1125 may be operated by the publisher of a multi-player game. In this example, Video Server System 1120 is optionally viewed as a client by Game Server 1125 and optionally configured to appear from the point of view of Game Server 1125 to be a prior art client executing a prior art game engine. Communication between Video Server System 1120 and Game Server 1125 optionally occurs via Network 1115. As such, Game Server 1125 can be a prior art multiplayer game server that sends game state information to multiple clients, one of which is game server system 1120. Video Server System 1120 may be configured to communicate with multiple instances of Game Server 1125 at the same time. For example, Video Server System 1120 can be configured to provide a plurality of different video games to different users. Each of these different video games may be supported by a different Game Server 1125 and/or published by different entities. In some embodiments, several geographically distributed instances of Video Server System 1120 are configured to provide game video to a plurality of different users. Each of these instances of Video Server System 1120 may be in communication with the same instance of Game Server 1125. Communication between Video Server System 1120 and one or more Game Server 1125 optionally occurs via a dedicated communication channel. For example, Video Server System 1120 may be connected to Game Server 1125 via a high bandwidth channel that is dedicated to communication between these two systems.

Video Server System 1120 comprises at least a Video Source 1130, an I/O Device 1145, a Processor 1150, and non-transitory Storage 1155. Video Server System 1120 may include one computing device or be distributed among a plurality of computing devices. These computing devices are optionally connected via a communications system such as a local area network.

Video Source 1130 is configured to provide a video stream, e.g., streaming video or a series of video frames that form a moving picture. In some embodiments, Video Source 1130 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1125. Game Server 1125 may maintain a copy of the state of the game based on game commands received from multiple players using geographically disperse clients. In these cases, the game state is provided by Game Server 1125 to Video Source 1130, wherein a copy of the game state is stored and rendering is performed. Game Server 1125 may receive game commands directly from Clients 1110 via Network 1115, and/or may receive game commands via Video Server System 1120.

Video Source 1130 typically includes rendering logic, e.g., hardware, firmware, and/or software stored on a computer readable medium such as Storage 1155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1110. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1130 includes a video recording device such as a camera. This camera may be used to generate delayed or live video that can be included in the video stream of a computer game. The resulting video stream, optionally includes both rendered images and images recorded using a still or video camera. Video Source 1130 may also include storage devices configured to store previously recorded video to be included in a video stream. Video Source 1130 may also include motion or positioning sensing devices configured to detect motion or position of an object, e.g., person, and logic configured to determine a game state or produce video-based on the detected motion and/or position.

Video Source 1130 is optionally configured to provide overlays configured to be placed on other video. For example, these overlays may include a command interface, log in instructions, messages to a game player, images of other game players, video feeds of other game players (e.g., webcam video). In embodiments of Client 1110A including a touch screen interface or a gaze detection interface, the overlay may include a virtual keyboard, joystick, touch pad, and/or the like. In one example of an overlay a player's voice is overlaid on an audio stream. Video Source 1130 optionally further includes one or more audio sources.

In embodiments wherein Video Server System 1120 is configured to maintain the game state based on input from more than one player, each player may have a different point of view comprising a position and direction of view. Video Source 1130 is optionally configured to provide a separate video stream for each player based on their point of view. Further, Video Source 1130 may be configured to provide a different frame size, frame data size, and/or encoding to each of Client 1110. Video Source 1130 is optionally configured to provide 3-D video.

I/O Device 1145 is configured for Video Server System 1120 to send and/or receive information such as video, commands, requests for information, a game state, gaze information, device motion, device location, user motion, client identities, player identities, game commands, security information, audio, and/or the like. I/O Device 1145 typically includes communication hardware such as a network card or modem. I/O Device 1145 is configured to communicate with Game Server 1125, Network 1115, and/or Clients 1110.

Processor 1150 is configured to execute logic, e.g. software, included within the various components of Video Server System 1120 discussed herein. For example, Processor 1150 may be programmed with software instructions in order to perform the functions of Video Source 1130, Game Server 1125, and/or a Client Qualifier 1160. Video Server System 1120 optionally includes more than one instance of Processor 1150. Processor 1150 may also be programmed with software instructions in order to execute commands received by Video Server System 1120, or to coordinate the operation of the various elements of Game System 1100 discussed herein. Processor 1150 may include one or more hardware device. Processor 1150 is an electronic processor.

Storage 1155 includes non-transitory analog and/or digital storage devices. For example, Storage 1155 may include an analog storage device configured to store video frames. Storage 1155 may include a computer readable digital storage, e.g. a hard drive, an optical drive, or solid state storage. Storage 1115 is configured (e.g. by way of an appropriate data structure or file system) to store video frames, artificial frames, a video stream including both video frames and artificial frames, audio frame, an audio stream, and/or the like. Storage 1155 is optionally distributed among a plurality of devices. In some embodiments, Storage 1155 is configured to store the software components of Video Source 1130 discussed elsewhere herein. These components may be stored in a format ready to be provisioned when needed.

Video Server System 1120 optionally further comprises Client Qualifier 1160. Client Qualifier 1160 is configured for remotely determining the capabilities of a client, such as Clients 1110A or 1110B. These capabilities can include both the capabilities of Client 1110A itself as well as the capabilities of one or more communication channels between Client 1110A and Video Server System 1120. For example, Client Qualifier 1160 may be configured to test a communication channel through Network 1115.

Client Qualifier 1160 can determine (e.g., discover) the capabilities of Client 1110A manually or automatically. Manual determination includes communicating with a user of Client 1110A and asking the user to provide capabilities. For example, in some embodiments, Client Qualifier 1160 is configured to display images, text, and/or the like within a browser of Client 1110A. In one embodiment, Client 1110A is an HMD that includes a browser. In another embodiment, client 1110A is a game console having a browser, which may be displayed on the HMD. The displayed objects request that the user enter information such as operating system, processor, video decoder type, type of network connection, display resolution, etc. of Client 1110A. The information entered by the user is communicated back to Client Qualifier 1160.

Automatic determination may occur, for example, by execution of an agent on Client 1110A and/or by sending test video to Client 1110A. The agent may comprise computing instructions, such as java script, embedded in a web page or installed as an add-on. The agent is optionally provided by Client Qualifier 1160. In various embodiments, the agent can find out processing power of Client 1110A, decoding and display capabilities of Client 1110A, lag time reliability and bandwidth of communication channels between Client 1110A and Video Server System 1120, a display type of Client 1110A, firewalls present on Client 1110A, hardware of Client 1110A, software executing on Client 1110A, registry entries within Client 1110A, and/or the like.

Client Qualifier 1160 includes hardware, firmware, and/or software stored on a computer readable medium. Client Qualifier 1160 is optionally disposed on a computing device separate from one or more other elements of Video Server System 1120. For example, in some embodiments, Client Qualifier 1160 is configured to determine the characteristics of communication channels between Clients 1110 and more than one instance of Video Server System 1120. In these embodiments the information discovered by Client Qualifier can be used to determine which instance of Video Server System 1120 is best suited for delivery of streaming video to one of Clients 1110.

Embodiments of the present invention may be practiced with various computer system configurations including hand-held devices, microprocessor systems, microprocessor-based or programmable consumer electronics, minicomputers, mainframe computers and the like. Several embodiments of the present invention can also be practiced in distributed computing environments where tasks are performed by remote processing devices that are linked through a wire-based or wireless network.

With the above embodiments in mind, it should be understood that a number of embodiments of the present invention can employ various computer-implemented operations involving data stored in computer systems. These operations are those requiring physical manipulation of physical quantities. Any of the operations described herein that form part of various embodiments of the present invention are useful machine operations. Several embodiments of the present invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Various embodiments of the present invention can also be embodied as computer readable code on a computer readable medium. The computer readable medium is any data storage device that can store data, which can be thereafter be read by a computer system. Examples of the computer readable medium include hard drives, network attached storage (NAS), read-only memory (ROM), random-access memory, compact disc-ROMs (CD-ROMs), CD-recordables (CD-Rs), CD-rewritables (RWs), magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the various embodiments of the present invention is not to be limited to the details given herein, but may be modified within the scope and equivalents of the appended claims.

What is claimed is:

1. A method for executing a video game, comprising:
   executing the video game, the executing generating content of interactive scenes of the video game for rendering on a screen of a head mounted display (HMD) worn by a user, the screen rendering the content in a non-transparent mode;
   detecting a shift in gaze direction of the user from a first gaze direction to a second gaze direction during interaction with the content to identify a real-world object in line with the second gaze direction;

receiving an image of the real-world object captured using an external camera of the HMD;

converting the image of the real-world object to digital data and adjusting the digital data to generate an image of a virtual object that corresponds with context of the content included in the interactive scenes of the video game; and providing the image of the virtual object for rendering in a portion of the screen that corresponds with a portion of the interactive scenes where the gaze direction of the user has shifted, the portion of the screen being rendered in a semi-transparent mode.

2. The method of claim 1, wherein the real-world object is an input device used to provide user input for the video game.

3. The method of claim 1, wherein the image of the virtual object is provided in the portion of the screen upon detecting the shift in the gaze direction lasts for at least a predefined period of time.

4. The method of claim 1, wherein a size of the image of the virtual object is adjusted in accordance to a size of the portion of the screen where the image of the virtual object is being rendered.

5. The method of claim 1, wherein the image of the virtual object is presented in the portion of the screen for a first period of time, and upon expiration of the first period of time, discontinuing presenting the image of the virtual object in the portion of the screen, the discontinuing causing the interactive scene of the video game to be rendered in the portion.

6. The method of claim 1, wherein remaining portion of the screen continues to be maintained in a non-transparent mode to render the interactive scenes of the video game.

7. The method of claim 1, wherein the image of the virtual object is super-imposed over images of the interactive scene rendered in the portion of the screen.

8. The method of claim 1, wherein the portion of the screen for rendering the image of the virtual object covers a part of a bottom portion of the screen, and wherein remaining part of the bottom portion and remaining portion of the screen continues to render the image of the interactive scene.

9. The method of claim 8, wherein the interactive scene in the remaining part of the bottom portion is rendered in a greyed-out format to simulate transitioning of the bottom portion to the semi-transparent mode.

10. The method of claim 1, wherein the image of the virtual object is rendered in the portion of the screen that corresponds with the position of the real-world object in a vicinity of the user.

11. The method of claim 1, wherein the real-world object in line with the gaze direction is determined by correlating input data captured using one or more internal cameras of the HMD with data captured from the external camera of the HMD and one or more outside cameras distributed within real-world environment in a vicinity of the user, the input data and the data captured from the internal camera, the external camera and the one or more outside cameras used to compute an angle of the shift in the gaze direction and to identify the object that corresponds with the angle of the shift in the gaze direction.

12. The method of claim 11, further includes generating a signal to the external camera of the HMD to capture the image of the real-world object;

tracking movement of a second real-world object in a vicinity of the user using the external camera of the HMD; and responsive to detecting the second real-world object moving within a field of view of the screen of the HMD, dynamically transitioning a second portion of the screen that correlates with a direction of the movement of the second real-world object to the semi-transparent mode so as to render image of the second real-world object in the second portion, the image of the second real-world object captured by the external camera of the HMD.

13. The method of claim 1, wherein the video game is executing on a game cloud and the content of the interactive scenes of the video game are forwarded to the HMD for rendering on the screen of the HMD.

14. The method of claim 1, wherein the video game is executing on a game console and the content of the interactive scenes of the video game are forwarded to the HMD for rendering on the screen of the HMD.

* * * * *